US011328298B2

(12) United States Patent
Gleeson et al.

(10) Patent No.: US 11,328,298 B2
(45) Date of Patent: May 10, 2022

(54) SYSTEM AND METHOD FOR REMOTELY ACTIVATING A PIN-PAD TERMINAL

(71) Applicant: The Toronto-Dominion Bank, Toronto (CA)

(72) Inventors: Bryan Michael Gleeson, Toronto (CA); John Henry Dunstan, Caledon (CA)

(73) Assignee: The Toronto-Dominion Bank, Toronto (CA)

( * ) Notice: Subject to any disclaimer, the term of this patent is extended or adjusted under 35 U.S.C. 154(b) by 652 days.

(21) Appl. No.: 15/291,360

(22) Filed: Oct. 12, 2016

(65) Prior Publication Data

US 2017/0154333 A1 Jun. 1, 2017

Related U.S. Application Data

(60) Provisional application No. 62/260,328, filed on Nov. 27, 2015.

(51) Int. Cl.
*G06Q 20/40* (2012.01)
*H04L 29/06* (2006.01)
*G06Q 20/38* (2012.01)

(52) U.S. Cl.
CPC ..... *G06Q 20/4012* (2013.01); *G06Q 20/3829* (2013.01); *H04L 63/0823* (2013.01); *H04L 63/0853* (2013.01); *H04L 2463/102* (2013.01)

(58) Field of Classification Search
CPC ......... G06Q 20/4012; G06Q 20/38215; G06Q 20/3829; H04L 63/0823; H04L 63/0853

USPC .......................................................... 705/72
See application file for complete search history.

(56) References Cited

U.S. PATENT DOCUMENTS

2013/0254116 A1\* 9/2013 Hayhow et al.
2013/0254119 A1\* 9/2013 Hayhow et al.
2015/0170126 A1\* 6/2015 Gleeson et al.

\* cited by examiner

*Primary Examiner* — James D Nigh
*Assistant Examiner* — Yin Y Choi
(74) *Attorney, Agent, or Firm* — Graham Patent Law

(57) ABSTRACT

A network gateway includes a gateway authenticator, a first network interface for interfacing the network gateway with a first computer network, and a second network interface for interfacing the network gateway with a second computer network that is distinct from the first computer network. The gateway authenticator receives from a pin-pad terminal, via the first computer network, an activation credential request that includes a first administrator credential. The pin-pad terminal receives the first administrator credential from a hardware token that is interfaced with the pin-pad terminal. The gateway authenticator is configured to (i) verify that, before the pin-pad terminal received the first administrator credential from the hardware token, the first computer network associated the first administrator credential with the pin-pad terminal; and (ii) install in the pin-pad terminal a digital authentication certificate that facilitates authentication of the pin-pad terminal to the second computer network via the network gateway.

20 Claims, 15 Drawing Sheets

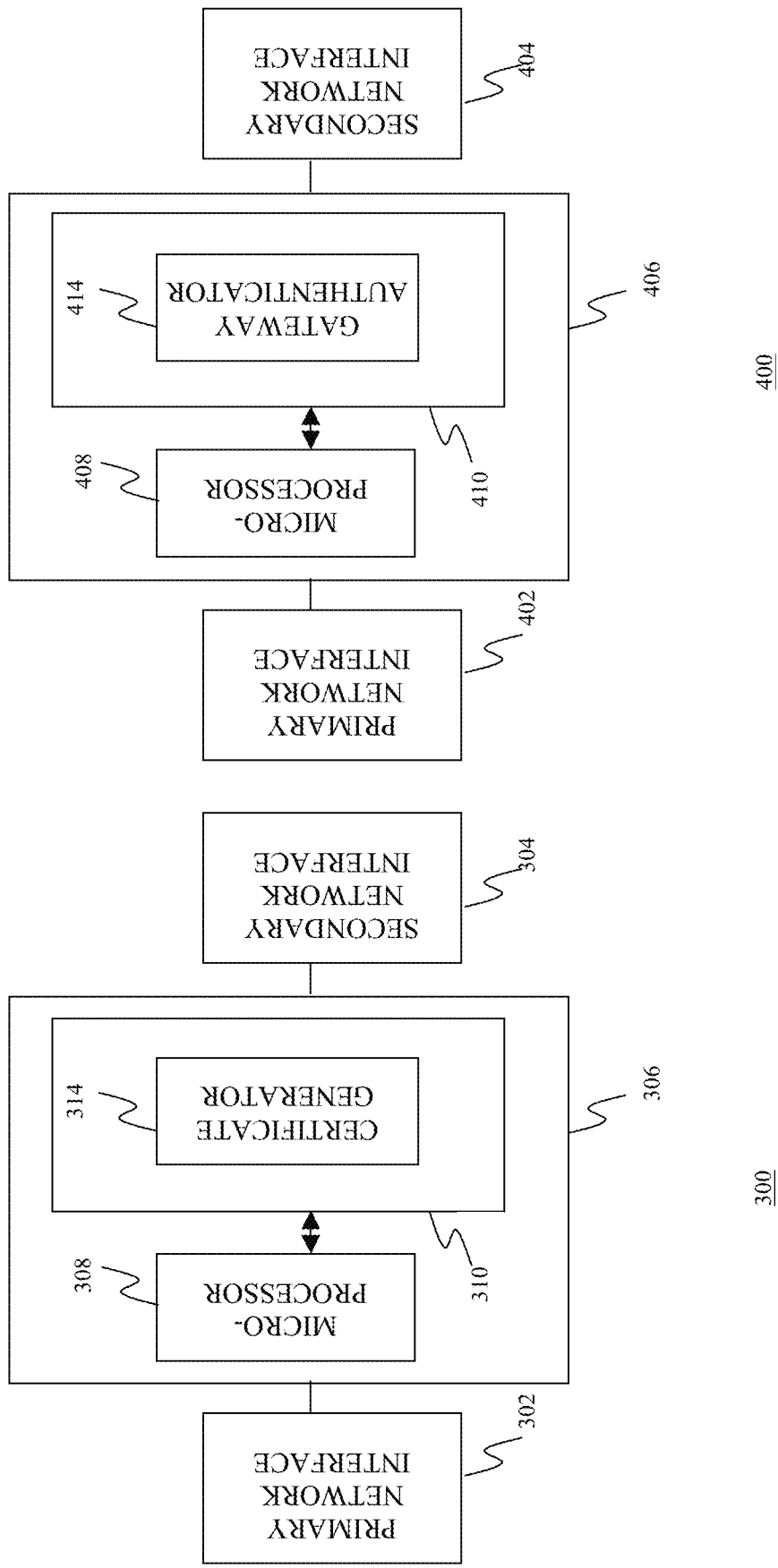

SYSTEM AND METHOD FOR REMOTELY ACTIVATING A PIN-PAD TERMINAL

RELATED APPLICATIONS

This patent application claims the benefit of the filing date of U.S. Patent Application Ser. No. 62/260,328, filed Nov. 27, 2015, the contents of which are incorporated herein by reference.

FIELD

This patent application relates to systems and methods for payment terminal authentication. In particular, this patent application describes systems and methods for activating and authenticating a pin-pad terminal.

BACKGROUND

Many merchants provide electronic pin-pad terminals to allow customers to purchase goods and services by means other than cash payment. The pin-pad terminals are connected to an acquirer network that interfaces with the merchant's financial institution (acquirer). The pin-pad terminals are configured with proprietary software and cryptographic keys, prior to deployment at the merchant, to allow the pin-pad terminals to securely transmit payment account information, received from payment cards (e.g. credit cards, debit cards) that may be interfaced with the pin-pad terminals, over the acquirer network to the merchant's acquirer for processing.

SUMMARY

By way of overview, this disclosure relates to a network gateway, a payment terminal, a method of remotely activating the payment terminal via the network gateway, a method of authenticating a payment terminal to a computer network via the network gateway, and computer-readable media that store processing instructions for implementing these methods.

The network gateway, according to the first aspect of this disclosure, includes a first network interface for interfacing the network gateway with a first computer network, and a second network interface for interfacing the network gateway with a second computer network that is distinct from the first computer network.

The network gateway also includes a gateway authenticator, in communication with the network interfaces, that is configured to (i) receive from a payment terminal, via the first computer network, an activation credential request that includes a first administrator credential. The payment terminal receives the first administrator credential from a hardware token that is interfaced with the payment terminal.

The gateway authenticator is also configured to (ii) verify that, before the payment terminal received the first administrator credential from the hardware token, the first computer network associated the first administrator credential with the payment terminal; and (iii) install a digital authentication certificate (x.509) in the payment terminal. The digital authentication certificate facilitates authentication of the payment terminal to the second computer network via the network gateway.

The method of remotely activating a payment terminal, according to the first aspect of this disclosure, involves a network gateway receiving from the payment terminal, via a first computer network, an activation credential request that includes a first administrator credential. The payment terminal receives the first administrator credential from a hardware token that is interfaced with the payment terminal.

The network gateway verifies that, before the payment terminal received the first administrator credential from the hardware token, the first computer network associated the first administrator credential with the payment terminal. The network gateway then installs a digital authentication certificate in the payment terminal. The digital authentication certificate facilitates authentication of the payment terminal to a second computer network, via the network gateway, distinct from the first computer network.

The computer-readable medium, according to the first aspect of this disclosure, includes non-transitory computer processing instructions stored thereon for execution by a network gateway. The computer processing instructions, when executed by the network gateway cause the network gateway to perform a sequence that involves receiving from a payment terminal, via a first computer network, an activation credential request that includes a first administrator credential. The payment terminal receives the first administrator credential from a hardware token that is interfaced with the payment terminal.

The computer processing instructions also cause the network gateway to verify that, before the payment terminal received the first administrator credential from the hardware token, the first computer network associated the first administrator credential with the payment terminal. The computer processing instructions also cause the network gateway to install in the payment terminal a digital authentication certificate that facilitates authentication of the payment terminal to a second computer network, via the network gateway, distinct from the first computer network.

The activation credential request may include a first terminal credential that is uniquely associated with the payment terminal. The network gateway may install the digital authentication certificate after verifying that, before the payment terminal received the first administrator credential from the hardware token, the first computer network associated the first administrator credential with the first terminal credential.

The network gateway may receive a second administrator credential from an input device of the payment terminal, and install the digital authentication certificate after confirming that the second computer network validated the administrator credentials.

In one implementation, the network gateway provides the payment terminal with a private cryptographic key, in response to the activation credential request, after verifying that, before the payment terminal received the first administrator credential from the hardware token, the first computer network associated the first administrator credential with the payment terminal. The network gateway may receive the digital authentication certificate from the first computer network after the first computer network verifies that the payment terminal provided the first computer network with a terminal activation request and generated the terminal activation request from the private cryptographic key.

The network gateway may provide the payment terminal with the private cryptographic key after verifying that, before the payment terminal received the first administrator credential from the hardware token, the first computer network associated the first administrator credential with the first terminal credential.

The network gateway may provide the payment terminal with a second terminal credential, and may install the digital authentication certificate after the first computer network verifying that (i) the payment terminal generated the terminal activation request from the private cryptographic key and the second terminal credential and (ii), before the network gateway provided the payment terminal with the second terminal credential, the private cryptographic key and the second terminal credential were associated with the payment terminal.

In one implementation, the network gateway receives a private cryptographic key from the first computer network after the network gateway verifying that, before the payment terminal received the first administrator credential from the hardware token, the first computer network associated the first administrator credential with the payment terminal. The network gateway generates a terminal activation request from the private cryptographic key, transmits the terminal activation request to the first computer network, and receives the digital authentication certificate from the first computer network in response to the terminal activation request after the first computer network verifies that the terminal activation request was generated from the private cryptographic key.

The network gateway may receive the digital authentication certificate from the first computer network after the first computer network verifying that, before the payment terminal received the first administrator credential from the hardware token, the first computer network associated the first administrator credential with the first terminal credential.

The network gateway may generate a second terminal credential, generate the terminal activation request from the private cryptographic key and the second terminal credential, and receive the digital authentication certificate from the first computer network after the first computer network verifies that (i) the terminal activation request was generated from the private cryptographic key and the second terminal credential and (ii), before the network gateway generated the terminal activation request, the private cryptographic key and the second terminal credential were associated with the payment terminal. The terminal activation request may include a certificate signing request, and the network gateway may generate a public cryptographic key from the private cryptographic key, generate the certificate signing request from the public cryptographic key and the second terminal credential, and sign the certificate signing request with the private cryptographic key (the public cryptographic key and the private cryptographic key comprising an asymmetric cryptographic key pair).

The method of authenticating a payment terminal to a computer network, according to the second aspect of this disclosure, involves the payment terminal receiving a first administrator credential from a hardware token that is interfaced with the payment terminal, generating an activation credential request from the first administrator credential, and transmitting the activation credential request to a network gateway. The network gateway is in communication with a first computer network and a second computer network that is distinct from the first computer network.

The payment terminal receives a digital authentication certificate from the first computer network, and saves the digital authentication certificate in a memory of the payment terminal. The digital authentication certificate facilitates authentication of the payment terminal to the second computer network via the network gateway. The payment terminal receives the digital authentication certificate after the network gateway verifies that, before the payment terminal received the first administrator credential from the hardware token, the first computer network associated the first administrator credential with the payment terminal.

The payment terminal, according to the second aspect of this disclosure, includes a memory, and a terminal authentication processor in communication with the memory. The terminal authentication processor is configured to (i) receive a first administrator credential from a hardware token interfaced with the payment terminal, (ii) generate an activation credential request from the first administrator credential, and (iii) transmit the activation credential request to a network gateway. The network gateway is in communication with a first computer network and a second computer network that is distinct from the first computer network.

The terminal authentication processor is also configured to (iv) receive a digital authentication certificate from the first computer network, and (v) save the digital authentication certificate in the memory. The digital authentication certificate facilitates authentication of the payment terminal to the second computer network via the network gateway. The terminal authentication processor receives the digital authentication certificate after the network gateway verifies that, before the payment terminal received the first administrator credential from the hardware token, the first computer network associated the first administrator credential with the payment terminal.

The computer-readable medium, according to the second aspect of this disclosure, includes non-transitory computer processing instructions stored thereon for execution by a payment terminal. The computer processing instructions, when executed by the payment terminal cause the payment terminal to perform a method that involves the payment terminal receiving a first administrator credential from a hardware token that is interfaced with the payment terminal, generating an activation credential request from the first administrator credential, and transmitting the activation credential request to a network gateway. The network gateway is in communication with a first computer network and a second computer network that is distinct from the first computer network.

The payment terminal receives a digital authentication certificate from the first computer network. The computer processing instructions also cause the payment terminal to save the digital authentication certificate in a memory of the payment terminal. The digital authentication certificate facilitates authentication of the payment terminal to the second computer network via the network gateway.

The payment terminal receives the digital authentication certificate after the network gateway verifies that, before the payment terminal received the first administrator credential from the hardware token, the first computer network associated the first administrator credential with the payment terminal.

The payment terminal may generate the activation credential request from the first administrator credential and from a first terminal credential that is uniquely associated with the payment terminal (and is stored in the memory of the payment terminal before the payment terminal generates the activation credential request).

The payment terminal may provide the network gateway with a second administrator credential (which the payment terminal received from an input device thereof), and save the digital authentication certificate in a non-volatile memory of the payment terminal after receiving from the network gateway confirmation that the second computer network validated the administrator credentials.

In one implementation, the payment terminal receives a private cryptographic key, in response to the activation credential request, after the network gateway verifies that, before the payment terminal received the first administrator credential from the hardware token, the first computer network associated the first administrator credential with the payment terminal. The payment terminal generates a terminal activation request, provides the first computer network with the terminal activation request, and receives the digital authentication certificate from the first computer network in response to the terminal activation request after the first computer network verifies that the payment terminal generated the terminal activation request from the private cryptographic key.

The payment terminal may receive the private cryptographic key after the network gateway verifies that, before the payment terminal received the first administrator credential from the hardware token, the first computer network associated the first administrator credential with the first terminal credential.

The payment terminal may receive a second terminal credential from the network gateway, and save the digital authentication certificate after the first computer network verifies that (i) the payment terminal generated the terminal activation request from the private cryptographic key and the second terminal credential and (ii), before the payment terminal received the second terminal credential, the private cryptographic key and the second terminal credential were associated with the payment terminal. The terminal activation request may include a certificate signing request, and the payment terminal may generate a public cryptographic key from the private cryptographic key, generate the certificate signing request from the public cryptographic key and the second terminal credential, and sign the certificate signing request with the private cryptographic key (the public cryptographic key and the private cryptographic key comprising an asymmetric cryptographic key pair).

BRIEF DESCRIPTION OF THE DRAWINGS

The foregoing aspects of this disclosure will now be described, by way of example, with reference to the accompanying drawings, in which:

FIG. 3 is a schematic view of the certificate server of the authentication network;

FIG. 4 is a schematic view of the network gateway of the authentication network;

DETAILED DESCRIPTION

Authentication Network—Overview

Figure 1:
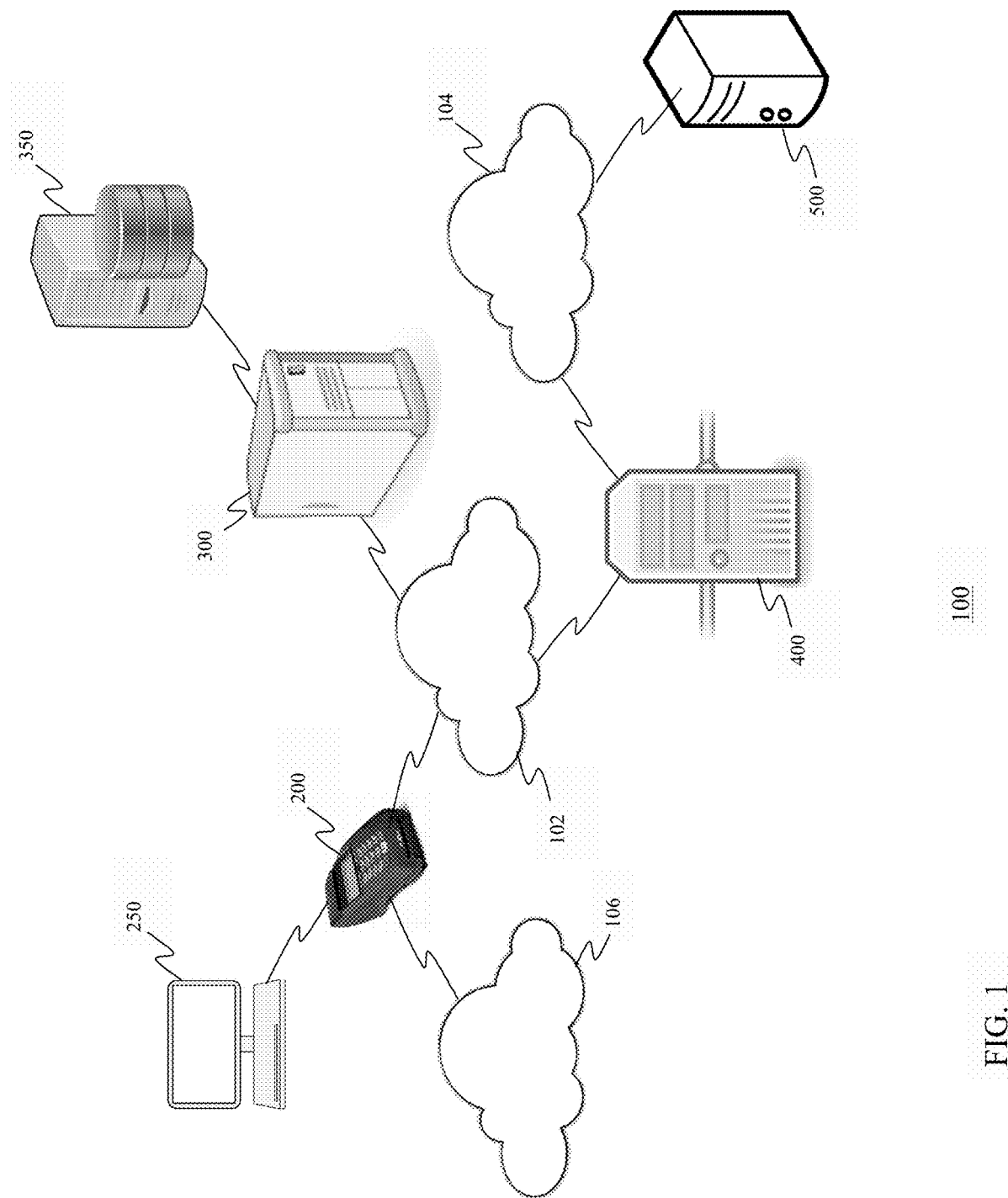
FIG. 1 is a block diagram that illustrates the various components of the authentication network.

Turning to FIG. 1, there is shown an authentication network, denoted generally by reference number 100, that includes a payment terminal 200 and a network gateway 400. The authentication network 100 may also include a certificate server 300 and a terminal management server 350. Although the authentication network 100 is shown comprising only a single payment terminal 200, typically the authentication network 100 includes a plurality of the payment terminals 200.

Similarly, although the authentication network 100 is shown comprising only a single certificate server 300 and a single network gateway 400, the authentication network 100 may include a plurality of certificate servers 300 and/or a plurality of the network gateways 400. Further, although the network gateway 400 is depicted as a monolithic network component, the functionality of the network gateway 400 may be split amongst multiple network components or servers.

The payment terminal 200 typically comprises a wireless or wired communications device. In one example, the payment terminal 200 is implemented as a pin-pad terminal and is configured to interface with a hardware token 210 and/or to an electronic cash register (ECR) 250. As non-limiting examples, the payment terminal 200 may comprise a passive/integrated ("dumb") pin-pad, or a semi-integrated ("smart") pin-pad. Alternately, the payment terminal 200 may be comprise an automated teller machine (ATM), or automated banking machine (ABM). The payment terminal 200 and the hardware token 210 will be discussed in further detail below.

The certificate server 300 may be implemented on one or more computer servers, and is configured to communicate with the payment terminal(s) 200 via a first computer network 102. Typically, the first computer network 102 comprises a wireline or wireless packet-switched (e.g. internet protocol or "IP", 3G, 4G) or circuit-switched network (e.g. public switched telephone network or "PSTN"), and includes the certificate server(s) 300 and the terminal management server 350. The certificate server 300 is also configured to facilitate authentication of the payment terminal(s) 200 to the network gateway 400, by issuing terminal authentication certificates to the payment terminals 200.

The terminal management server 350 may include a database of records, each associated with a respective payment terminal 200. As will be discussed below, the certificate server 300 may make use of the terminal management server 350 to validate the payment terminals 200.

The network gateway 400 may be implemented on one or more computer servers, and is configured to communicate with the payment terminal(s) 200 via the first computer network 102 and to authenticate the payment terminal(s) 200. The network gateway 400 may be separate and distinct from the certificate server 300. If the authentication network 100 includes a plurality of the network gateways 400, each network gateway 400 may communicate with a respective portion of the payment terminal(s) 200 via a respective first computer network 102.

As will be explained in further detail below, the network gateway 400 is also configured to authenticate itself to a second computer network 104, that is distinct from the first computer network 102, and thereby allow users of the payment terminals 200 to complete electronic transactions with network devices 500 of the second computer network 104. Typically, the second computer network 104 comprises a packet-switched network that includes the network device 500, and the network device 500 comprises a computer server.

One of more of the payment terminals 200 may also be configured to communicate with the merchant's secure acquirer network 106, that is distinct from the communications networks 102, 104, to thereby effect payment for the electronic transaction.

As used herein, an "electronic transaction" is any electronic transaction (e.g. purchase of goods/services, bill payment, funds transfer, bank account or credit card balance query) that is performed by a network device and is available at the payment terminal 200. In one implementation, the payment terminal 200 is a pin-pad terminal, the network device is a computer server, and the electronic transaction involves using the pin-pad terminal 200 to purchase lottery tickets from the computer server. It should be understood, however, that the invention described herein is not so limited to this particular implementation.

Payment Terminal/Hardware Token

Figure 2:
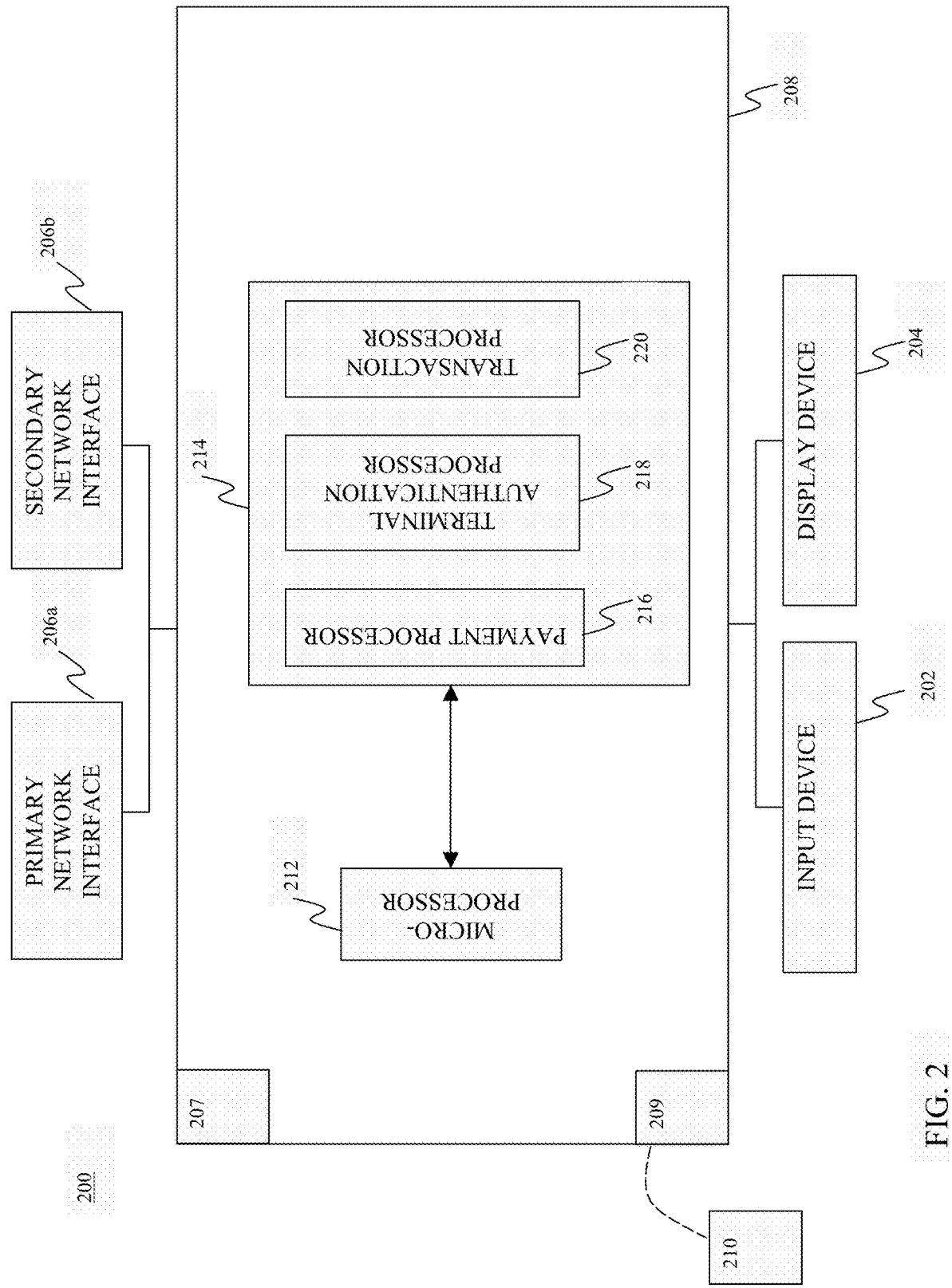
FIG. 2 is a schematic view of the payment terminal of the authentication network.

As mentioned, the payment terminal 200 is typically implemented as a wireless or wired pin-pad terminal. As shown in FIG. 2, the payment terminal 200 includes a user interface/input device 202, a display device 204, a first network interface 206a, a second network interface 206b, an ECR interface 207, and a computer processing unit 208 that is coupled to the input device 202, the display device 204, the network interfaces 206a, 206b and the ECR interface 207. The input device 202, the display device 204, the network interfaces 206a, 206b, the ECR interface 207 and the computer processing unit 208 may be integrated together within a common housing. The payment terminal 200 may also include a contact/contactless token interface 209 that is coupled to the computer processing unit 208 and is configured to communicate with the hardware token 210.

The input device 202 may be implemented as a keyboard, touchpad, and/or touchscreen and/or other input device suitable for allowing an operator of the payment terminal 200 to input data and/or commands into the payment terminal 200. The display device 204 may comprise a liquid crystal display (LCD) panel, cathode ray tube (CRT) display, plasma display panel, and/or paper printer and/or other output device suitable for displaying information to the operator of the payment terminal 200.

The first network interface 206a interfaces the payment terminal 200 with the first computer network 102. The second network interface 206b interfaces the payment terminal 200 with the secure acquirer network 106. The ECR interface 207 may be used to interface the payment terminal 200 with the electronic cash register (ECR) 250. The ECR interface 207 may comprise a serial port for accepting a wired connection with the ECR 250, or may comprise a wireless interface for wireless communication with the ECR 250.

The computer processing unit 208 may include a microprocessor 212 and computer-readable medium 214. The computer-readable medium 214 may be provided as a combination of volatile and non-volatile (e.g. FLASH) electronic computer memory. The non-volatile memory 214 stores all the digital certificates and cryptographic payment keys that may be required for the payment terminal 200 to process payment transactions via the secure acquirer network 106. The non-volatile memory 214 may also store one or more credentials ("terminal credentials") that are uniquely associated with the payment terminal 200. As non-limiting examples, the terminal credentials may comprise a serial number of the payment terminal 200.

The non-volatile memory 214 may also store computer processing instructions which, when loaded into the volatile memory 214 and executed by the microprocessor 212 therefrom, define an operating system (not shown) that allows the payment terminal 200 to accept user input from the input device 202 and to control the display device 204 and the token interface 209. The computer processing instructions may also define a payment processor 216 which, in conjunction with the aforementioned digital certificates and cryptographic payment keys, allows the payment terminal 200 to pay for transactions via the acquirer network 106.

The hardware token 210 typically comprises a self-contained integrated circuit device that includes a built-in micro-controller and protected memory. The micro-controller and protected memory together provide a secure self-contained computing environment for running cryptographic (e.g. data encryption standard (DES), triple-DES, advanced encryption standard (AES)) algorithms.

The hardware token 210 may have a contactless (e.g. NFC and/or ISO 14443 based) form factor, and may communicate with the payment terminal 200 via a wireless protocol, such as ISO 14443. For example, the hardware token 210 may be implemented as a contactless smartcard or integrated circuit card (e.g. credit card, debit card) or within a wireless telephone or wireless data messaging device, and the token interface 209 may be configured to communicate with the hardware token 210 using near-field communication or Bluetooth. Alternately, the hardware token 210 may have a contact form factor, and may interface directly with the payment terminal 200. For example, the hardware token 210 may be implemented as a contact-style smartcard or integrated circuit card (e.g. credit card, debit card). The token interface 209 may be configured to communicate with the hardware token 210 via a physical port (e.g. card reader) of the payment terminal 200.

Typically, the protected memory of the hardware token 210 is configured with a cryptographic key ("token cryptographic key") and one or more credentials ("administrator credentials") that were uniquely assigned to the intended recipient of the hardware token 210 by the issuer of the hardware token 210. As non-limiting examples, the administrator credentials may comprise an administrator identifier ("sysID") and/or an administrator passcode. The administrator credentials and token cryptographic key may be stored in the protected memory at the time the hardware token 210 is manufactured or prior to delivery of the hardware token 210 to the intended individual.

The administrator credentials and the stored token cryptographic key may be uniquely associated with the hardware token 210. Further, typically the stored token cryptographic key is a private cryptographic key that is not publicly available, but is either known or can be re-generated only by the issuer of the hardware token 210. As will be discussed below, the hardware token 210 may use the administrator credential sysID and the token cryptographic key in the cryptographic algorithms to generate cryptograms ("token cryptograms") that are used by the second computer network 104 to authenticate the payment terminal 200 to the second computer network 104.

The computer processing instructions of the memory 214 may define a terminal authentication processor 218 that allows the payment terminal 200 to authenticate to the network gateway 400, and a transaction processor 220 that allows the payment terminal 200 to complete a transaction with a network device 500 of the second computer network 104. Although the terminal authentication processor 218 and the transaction processor 220 may be implemented as computer processing instructions, all or a portion of the functionality of the terminal authentication processor 218 and/or the transaction processor 220 may be implemented instead in electronics hardware, such as a field programmable logic gate array (FPGA) or a complex programmable logic device (CPLD).

In one embodiment, the terminal authentication processor 218 is configured to generate a terminal activation request from a private cryptographic key (activation code) and from at least one terminal credential (e.g. terminal ID, terminal serial number) that are uniquely associated with the payment terminal 200. As will be discussed below, the administrator of the payment terminal 200 may manually input the private cryptographic key (activation code) into the payment terminal 200 via the input device 202. Alternately, the activation code may be stored on a hardware token (e.g. hardware token 210), and the administrator may input the activation code into the payment terminal 200 by interfacing the hardware token with the payment terminal 200.

The terminal activation request includes a public cryptographic key. The public cryptographic key and the activation code comprise an asymmetric cryptographic key pair. The terminal authentication processor 218 may implement a cryptographic (e.g. data encryption standard (DES), triple-DES, advanced encryption standard (AES)) algorithm, and may generate the public cryptographic key from the activation code. The terminal activation request may also include at least one of the terminal credentials, and the terminal authentication processor 218 uses the activation code and the cryptographic algorithm to digitally-sign the terminal activation request.

The terminal authentication processor 218 is configured to transmit the terminal activation request to the certificate server 300, and to save in the memory 214 an activation response that is received from the certificate server 300 in response to the terminal activation request. The activation response includes a digital terminal authentication certificate. The terminal authentication certificate includes the public cryptographic key that was included with the terminal activation request. Typically, the terminal authentication certificate is digitally-signed by the certificate server 300.

The terminal authentication processor 218 is also configured to authenticate the payment terminal 200 to the certificate server 300 and/or to a computer server, distinct from the certificate server 300, using the saved terminal authentication certificate. In the embodiment described below, the terminal authentication processor 218 uses the terminal authentication certificate to authenticate to the network gateway 400, and may also use the terminal authentication certificate to authenticate to certificate server 300 in order to renew the terminal authentication certificate. However, it should be understood that the terminal authentication certificate may be used to authenticate the payment terminal 200 to any network device that is accessible, directly or indirectly, to the payment terminal 200.

In another embodiment, the non-volatile memory 214 stores a terminal credential (e.g. terminal serial number) that is uniquely associated with the payment terminal 200, and the terminal authentication processor 218 is configured to receive a first administrator credential (e.g. sysID) from a hardware token 210 that is interfaced with the payment terminal 200, generate an activation credential request from the first administrator credential, and transmit the activation credential request to the network gateway 400. As mentioned above, the network gateway 400 is in communication with the first computer network 102 and the second computer network 104 (which is distinct from the first computer network 102).

The terminal authentication processor 218 is configured to receive a digital authentication certificate from the first computer network 102, and to save the digital authentication certificate in the memory 214. The terminal authentication processor 218 receives the digital authentication certificate after the network gateway 400 verifies that, before the payment terminal 200 received the first administrator credential from the hardware token 210, the first computer network 102 associated the first administrator credential with the payment terminal 200. As will be explained, the digital authentication certificate facilitates authentication of the payment terminal 200 to the second computer network 104 via the network gateway 400.

As will be discussed in greater detail below, the payment terminal 200 may receive the private cryptographic key from the network gateway 400, in response to the activation credential request, after the network gateway 400 verifies that, before the payment terminal 200 received the first administrator credential from the hardware token 210, the first computer network 102 associated the first administrator credential with the payment terminal 200. The terminal authentication processor 218 may generate a terminal activation request, transmit the terminal activation request to the first computer network 102, and receive the digital authentication certificate from the first computer network 102, in response to the terminal activation request, after the first computer network 102 verifies that the payment terminal 200 generated the terminal activation request from the private cryptographic key.

The payment terminal 200 may also receive a second terminal credential (e.g. terminal ID) from the network gateway 400 (in addition to the private cryptographic key), and may receive the digital authentication certificate after the first computer network 102 verifies that (i) the payment terminal 200 generated the terminal activation request from the private cryptographic key and the second terminal credential and (ii) the private cryptographic key and the second terminal credential were associated with the payment terminal 200 before the payment terminal 200 received the second terminal credential.

The terminal activation request may include a certificate signing request, and the terminal authentication processor 218 may be configured to the generate a public cryptographic key from the private cryptographic key (the public cryptographic key and the private cryptographic key comprising an asymmetric cryptographic key pair), generate the certificate signing request from the public cryptographic key and the second terminal credential, and sign the certificate signing request with the private cryptographic key.

The transaction processor 220 is configured to generate a transaction proposal from one or more of the administrator credentials (e.g. sysID, administrator passcode), and to transmit the transaction proposal to the network gateway 400, via the first network interface 206*a*. The transaction proposal identifies a proposed transaction that the operator of the payment terminal 200 proposes to engage in with a network device 500 of the second computer network 104. Accordingly, the transaction proposal may also include payment particulars for the proposed transaction or include one or more predefined transaction identifiers which the network gateway 400 can use to calculate or otherwise determine the payment particulars.

The transaction processor 220 is configured to receive from the network gateway 400 a transaction proposal response that is issued in response to the transaction proposal. The transaction proposal response specifies a pointer to the proposed transaction. As will be explained below, the network gateway 400 may generate the transaction pointer from the administrator credentials, payment particulars and/or transaction identifiers (if any) that were included in the transaction proposal. Alternately, or additionally, the transaction pointer may comprise a pseudo-random number generated by the network gateway 400. The transaction proposal response may also identify the payment particulars for the proposed transaction. The transaction processor 220 may save the transaction proposal response in the memory 214.

The transaction processor 220 may also be configured to transmit over the acquirer network 106, via the second network interface 206*b*, payment particulars for effecting payment for the proposed transaction, and to receive from the acquirer network 106 a payment confirmation in response to the payment particulars. After payment for the proposed transaction is confirmed, the transaction processor 220 generates a transaction completion request from the administrator credential and the transaction pointer, and transmits the transaction completion request to the network client 500 via the first network interface 206*a* and the network gateway 400. The transaction completion request requests completion of the proposed transaction with the network device 500.

The payment particulars included with the transaction proposal response may include an indication of the required payment amount for the proposed transaction. The transaction processor 220 may also be configured to electronically transmit the payment amount indication to the electronic cash register 250, via the ECR interface 207, in response to a transaction information request received from the electronic cash register 250, receive from the electronic cash register 250 a payment completion message confirming payment for the proposed transaction, generate the transaction completion request, and transmit the transaction completion request to the network device 500 via the first network interface 206*a* and the network gateway 400.

The payment completion message may confirm payment in at least the required payment amount for the proposed transaction, and the transaction processor 220 may be configured to validate the payment completion message from a comparison with the transaction proposal response.

Electronic Cash Register

Each electronic cash register (ECR) 250 is deployed in a respective checkout lane of the merchant's store, and interfaces with a pin-pad terminal 200. The ECR 250 includes an input device, a display device, a bar code scanner, and a data processing system that is coupled to the input device, the display device and the bar code scanner.

The input device may be implemented as a keyboard, touchpad, and/or touchscreen and/or other input device suitable for allowing an operator of the ECR 250 to input data and/or commands into the ECR 250. The display device may comprise a liquid crystal display (LCD) panel, cathode ray tube (CRT) display, plasma display panel, and/or paper printer and/or other output device. The bar code scanner may comprise a 1-D and/or 2-D (e.g. Quick Response) bar code scanner.

The data processing system includes a microprocessor and a computer-readable medium that stores computer processing instructions which, when executed by the microprocessor, implement an operating system and a checkout processor. The operating system controls the input device, the display device and the bar code scanner. The data processing system may also include a network interface that interfaces the ECR 250 with a local product code database that associates product codes with particulars (e.g. current price, product name) of goods/services that are being offered for sale by the merchant ("merchant's goods/services").

The checkout processor is configured to use the bar code scanner to read bar codes that may be affixed to or otherwise associated with the merchant goods/services and/or bar codes associated with a transaction initiated by the pin-pad terminal 200 with the network device 500 (e.g. lottery ticket purchase). The checkout processor is also configured to extract product codes (e.g. universal product codes or UPCs) from the bar codes read by the bar code scanner, to save in a local session database or list ("electronic shopping basket") the particulars (e.g. price, name) of each good/service being purchased by the customer, and to calculate the total monetary amount owing for the goods/services in the electronic shopping basket.

Certificate Server/Terminal Management Server

The certificate server 300 is implemented as one or more networked computer servers. As shown in FIG. 3, the certificate server 300 includes a primary network interface 302, a secondary network interface 304, and a computer processing unit 306 that is coupled to the primary network interface 302 and the secondary network interface 304. The primary network interface 302 interfaces the certificate server 300 with the first computer network 102 and allows the certificate server 300 to communicate with the payment terminals 200. The secondary network interface 304 interfaces the certificate server 300 with the terminal management server 350.

The computer processing unit 306 of the certificate server 300 may include a microprocessor 308 and a computer-readable medium 310. The computer-readable medium 310 may be provided as electronic computer memory (e.g. flash memory) or optical or magnetic memory (e.g. compact disc, hard disk) and may include computer processing instructions stored thereon which, when executed by the microprocessor 308, define an operating system (not shown) that controls the overall operation of the certificate server 300.

The computer processing instructions may also implement a certificate generator 314 that generates the terminal authentication certificates which allow the payment terminals 200 to authenticate to the network gateway 400. The certificate generator 314 also allows the payment terminals 200 to renew their respective terminal authentication certificates. Although the certificate generator 314 may be implemented as computer processing instructions, all or a portion of the functionality of the certificate generator 314 may be implemented instead in electronics hardware, such as a field programmable logic gate array (FPGA) or a complex programmable logic device (CPLD).

The certificate generator 314 is configured to receive a terminal activation request from a payment terminal 200, and to determine a validity of the terminal activation request. The terminal activation request includes a digital signature and a public cryptographic key. The certificate generator 314 determines the validity of the terminal activation request by verifying that the digital signature was generated from a private cryptographic key that is uniquely associated with the payment terminal 200, and that the public cryptographic key and the private cryptographic key comprise an asymmetric cryptographic key pair.

As discussed above, the terminal management server 350 may include a database of records, each associated with a respective payment terminal 200. Each database record may identify the terminal credentials (e.g. terminal ID, terminal serial number) that are uniquely associated with the payment terminal 200. The terminal activation request may include the terminal credentials of the payment terminal 200. The certificate generator 314 may determine the validity of the terminal activation request by, before (or after) verifying the digital signature on the terminal activation request, using the terminal management server 350 to verify that the terminal credentials included in the terminal activation request are associated with a common payment terminal 200.

The certificate generator 314 is configured to, in accordance with the terminal activation request validity determination, generate an activation response in response to the terminal activation request and transmit the activation response to the payment terminal 200. The activation response comprises a digital authentication certificate that includes the public cryptographic key and facilitates authentication of the payment terminal 200 to a computer server, distinct from the certificate server 300.

The certificate generator 314 may also be configured to receive from the payment terminal 200 a certificate renewal request requesting renewal of the digital authentication certificate, and to determine a validity of the certificate renewal request. The certificate renewal request may include the public cryptographic key and a further digital signature. The certificate generator 314 may determine the validity of the certificate renewal request by verifying that the digital signature of the certificate renewal request was generated from the private cryptographic key that is uniquely associated with the payment terminal 200 and that the public cryptographic key and the private cryptographic key comprise an asymmetric cryptographic key pair.

The certificate generator 314 may be configured to, in accordance with the certificate renewal request validity determination, generate a renewal response in response to the certificate renewal request and transmit the renewal response to the payment terminal 200. The renewal response may include a renewed digital authentication certificate that includes the public cryptographic key and facilitates authentication of the payment terminal 200 to the computer server. The certificate generator may use the digital authentication certificate (that was included in the activation response) to establish an encrypted connection with the payment terminal 200, and may receive the certificate renewal request from, and transmit the renewal response to, the payment terminal 200 over the encrypted connection.

Network Gateway

The network gateway 400 is implemented as one or more networked computer servers. As shown in FIG. 4, the network gateway 400 includes a primary network interface 402, a secondary network interface 404, and a computer processing unit 406 that is coupled to the primary network interface 402 and the secondary network interface 404. The primary network interface 402 interfaces the network gateway 400 with the first computer network 102 and allows the network gateway 400 to communicate with the payment terminals 200. The secondary network interface 404 interfaces the network gateway 400 with the second computer network 104 and allows the network gateway 400 to communicate with network devices 500 of the second computer network 104.

The computer processing unit 406 may include a microprocessor 408 and a computer-readable medium 410. The computer-readable medium 410 may be provided as electronic computer memory (e.g. flash memory) or optical or magnetic memory (e.g. compact disc, hard disk) and may include computer processing instructions stored thereon which, when executed by the microprocessor 408, define an operating system (not shown) that controls the overall operation of the network gateway 400.

The computer processing instructions may also implement a gateway authenticator 414. In one embodiment, the gateway authenticator 414 is configured to receive an authentication request from a payment terminal 200, and to transmit the authentication request to a computer network. The authentication request typically includes a token cryptogram that is generated from a cryptographic key that is stored on a hardware token 210 that is interfaced with the payment terminal 200. The gateway authenticator 414 is also configured to receive an authentication response from the computer network in response to a validity of the token cryptogram. The authentication response includes a gateway authentication certificate which the network gateway 400 uses to authenticate to a network device of the computer network.

In an embodiment described below, the network gateway 400 transmits the authentication request to, and receives the authentication response from the second computer network 104, and uses the gateway authentication certificate to authenticate to a network device 500 of the second computer network 104. However, this configuration is not essential; the network gateway 400 may transmit the authentication request to any network device that can issue a gateway authentication certificate which the network gateway 400 may require to access a particular network.

In another embodiment, the gateway authenticator 414 is configured to receive from a payment terminal 200 an activation credential request that includes a first administrator credential (e.g. sysID). The payment terminal 200 receives the first administrator credential from a hardware token 210 that is interfaced with the payment terminal 200. The gateway authenticator 414 is also configured to verify that, before the payment terminal 200 received the first administrator credential from the hardware token 210, the first computer network 102 associated the first administrator credential with the payment terminal 200. The network gateway 400 then installs a digital authentication certificate in the payment terminal 200. The digital authentication certificate facilitates authentication of the payment terminal 200 to the second computer network 104 via the network gateway 400.

As will be discussed in greater detail below, the activation credential request may include a first terminal credential (e.g. terminal s/n) that is uniquely associated with the payment terminal 200, and the gateway authenticator 414 may be configured to install the digital authentication certificate after verifying that, before the payment terminal 200 received the first administrator credential from the hardware token 210, the first computer network 102 associated the first administrator credential with the first terminal credential.

The gateway authenticator 414 may be configured to provide the payment terminal 200 with a private cryptographic key, in response to the activation credential request, after verifying that, before the payment terminal 200 received the first administrator credential from the hardware token 210, the first computer network 102 associated the first administrator credential with the payment terminal 200. The network gateway 400 may receive a terminal activation request from the payment terminal 200, transmit the terminal activation request to the first computer network 102 (e.g. the certificate server 300), and receive the digital authentication certificate from the first computer network 102, in response to the terminal activation request, after the first computer network 102 verifies that the payment terminal 200 generated the terminal activation request from the private cryptographic key.

The gateway authenticator 414 may be configured to provide the private cryptographic key after verifying that, before the payment terminal 200 received the first administrator credential from the hardware token 210, the first computer network 102 associated the first administrator credential with the first terminal credential.

The network gateway 400 may be configured to provide the payment terminal 200 with a second terminal credential (in addition to the private cryptographic key), and to install the digital authentication certificate after the first computer network 102 verifies that (i) the payment terminal 200 generated the terminal activation request from the private cryptographic key and the second terminal credential and (ii), before the network gateway 400 provided the payment terminal 200 with the second terminal credential, the private cryptographic key and the second terminal credential were associated with the payment terminal.

The network gateway 400 may also receive a second administrator credential (e.g. administrator passcode) from the input device 202 of the payment terminal 200, and the gateway authenticator 414 may be configured to install the digital authentication certificate after confirming that the second computer network 104 validated the first and second administrator credentials.

In another embodiment, the activation credential request includes a first terminal credential (e.g. terminal s/n) that is uniquely associated with the payment terminal 200, and the gateway authenticator 414 is configured to receive a private cryptographic key from the first computer network 102 after verifying that, before the payment terminal 200 received the first administrator credential from the hardware token 210, the first computer network 102 associated the first administrator credential with the payment terminal 200. The gateway authenticator 414 generates a terminal activation request from the private cryptographic key, transmits the terminal activation request to the first computer network 102 (e.g. the certificate server 300), and receives the digital authentication certificate from the first computer network 102 in response to the terminal activation request, after the first computer network 102 verifies that the terminal activation request was generated from the private cryptographic key.

The gateway authenticator 414 may be configured to the receive the digital authentication certificate from the first computer network 102 after the first computer network 102 verifying that, before the payment terminal 200 received the first administrator credential from the hardware token 210, the first computer network 102 associated the first administrator credential with the first terminal credential.

The gateway authenticator 414 may be configured to generate a second terminal credential (e.g. terminal ID), generate the terminal activation request from the private cryptographic key and the second terminal credential, and receive the digital authentication certificate from the first computer network 102 after the first computer network 102 verifies that (i) the terminal activation request was generated from the private cryptographic key and the second terminal credential and (ii), before the network gateway 400 generated the terminal activation request, the private cryptographic key and the second terminal credential were associated with the payment terminal 200.

The terminal activation request may include a certificate signing request, and the gateway authenticator 414 may be configured to generate a public cryptographic key from the private cryptographic key (the public cryptographic key and the private cryptographic key comprising an asymmetric cryptographic key pair), generate the certificate signing request from the public cryptographic key and the second terminal credential, and sign the certificate signing request with the private cryptographic key.

Although the gateway authenticator 414 may be implemented as computer processing instructions, all or a portion of the functionality of the gateway authenticator 414 may be implemented instead in electronics hardware, such as a field programmable logic gate array (FPGA) or a complex programmable logic device (CPLD).

Terminal Authentication Processing—Overview

Figure 5:
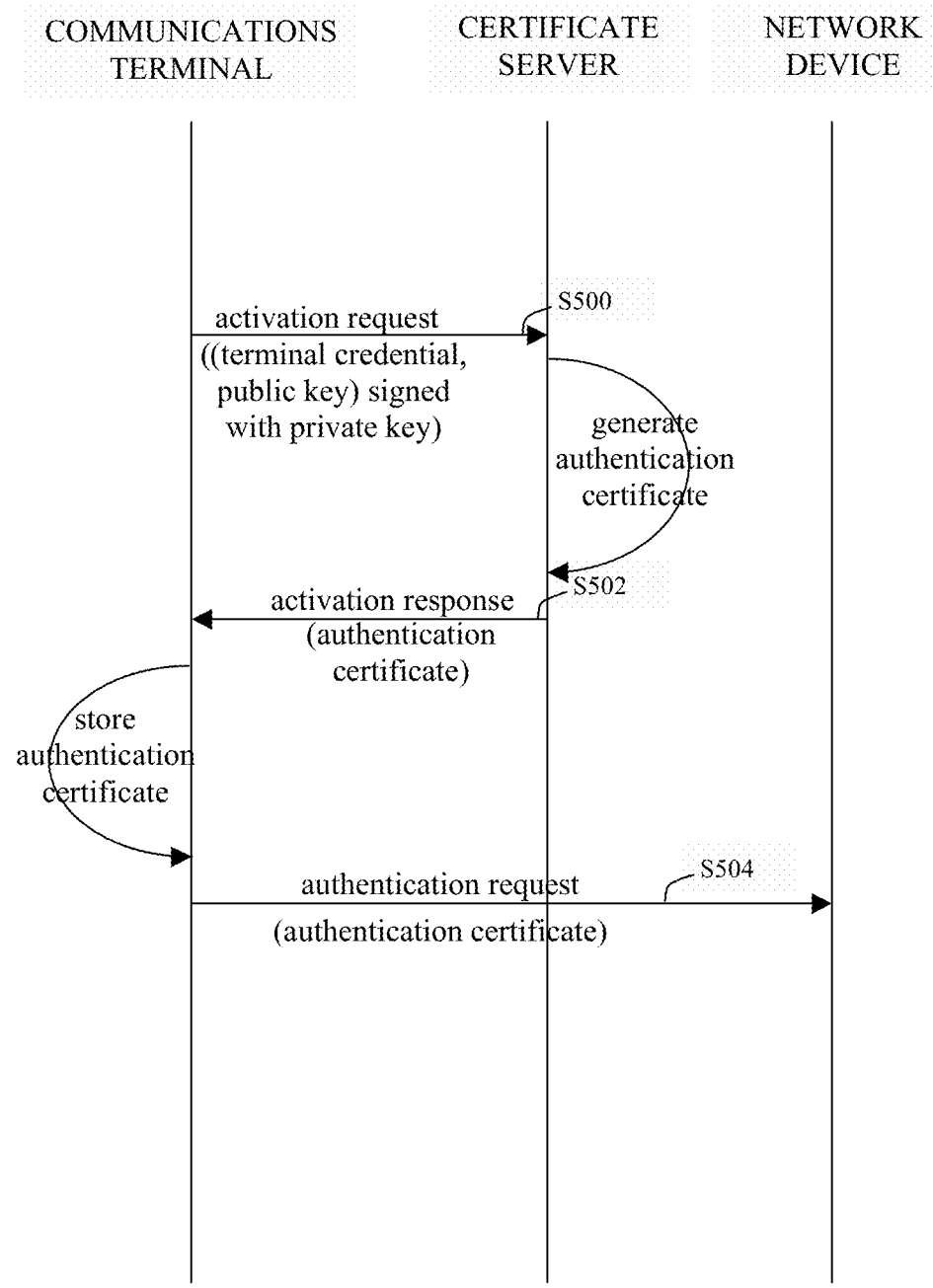
FIG. 5 is a message flow diagram that depicts, by way of overview, the payment terminal authenticating method implemented by the authentication network.

As discussed, the payment terminal 200 implements a method of authenticating the payment terminals 200 to a computer network. A sample embodiment of the payment terminal authenticating method is depicted in FIG. 5. In this embodiment, the payment terminal 200 may be implemented as a pin-pad terminal.

At the outset of the method, the payment terminal 200 generates a terminal activation request from a private cryptographic key (activation code) that is input into or saved in the payment terminal 200, and from at least one terminal credential that is uniquely associated with the payment terminal 200. The terminal activation request includes a public cryptographic key. The public cryptographic key and the private cryptographic key comprise an asymmetric cryptographic key pair. The payment terminal 200 transmits the terminal activation request to the certificate server 300, at step S500.

At step S502, the payment terminal 200 receives an activation response from the certificate server 300 in response to the terminal activation request. The activation response comprises a digital authentication certificate that includes the public cryptographic key that was included with the terminal activation request.

The certificate server 300 may sign the digital authentication certificate using the certificate server's private cryptographic key. The certificate server 300 may determine the validity of the terminal credential, and may generate the digital authentication certificate after successfully validating the terminal credential. Alternately, the certificate server 300 may forward the activation request to a certificate signing authority for generation of the digital authentication certificate (in one example after the certificate server 300 validates the terminal credential), or may generate the digital authentication certificate after forwarding the activation request to another network device for credential validation.

At step S504, the payment terminal 200 uses the digital authentication certificate to authenticate to a network device 500 that is distinct from the certificate server 300. As discussed above, typically the payment terminal 200 uses the digital authentication certificate to authenticate to the network gateway 400. However, the digital authentication certificate may be used to authenticate to any network device that is accessible, directly or indirectly, to the payment terminal 200. Since conventional pin-pad authentication techniques only use the pin-pad serial number to authenticate the pin-pad terminal, this solution offers a significant advantage over the state of the art.

Gateway Authentication Processing—Overview

Figure 6:
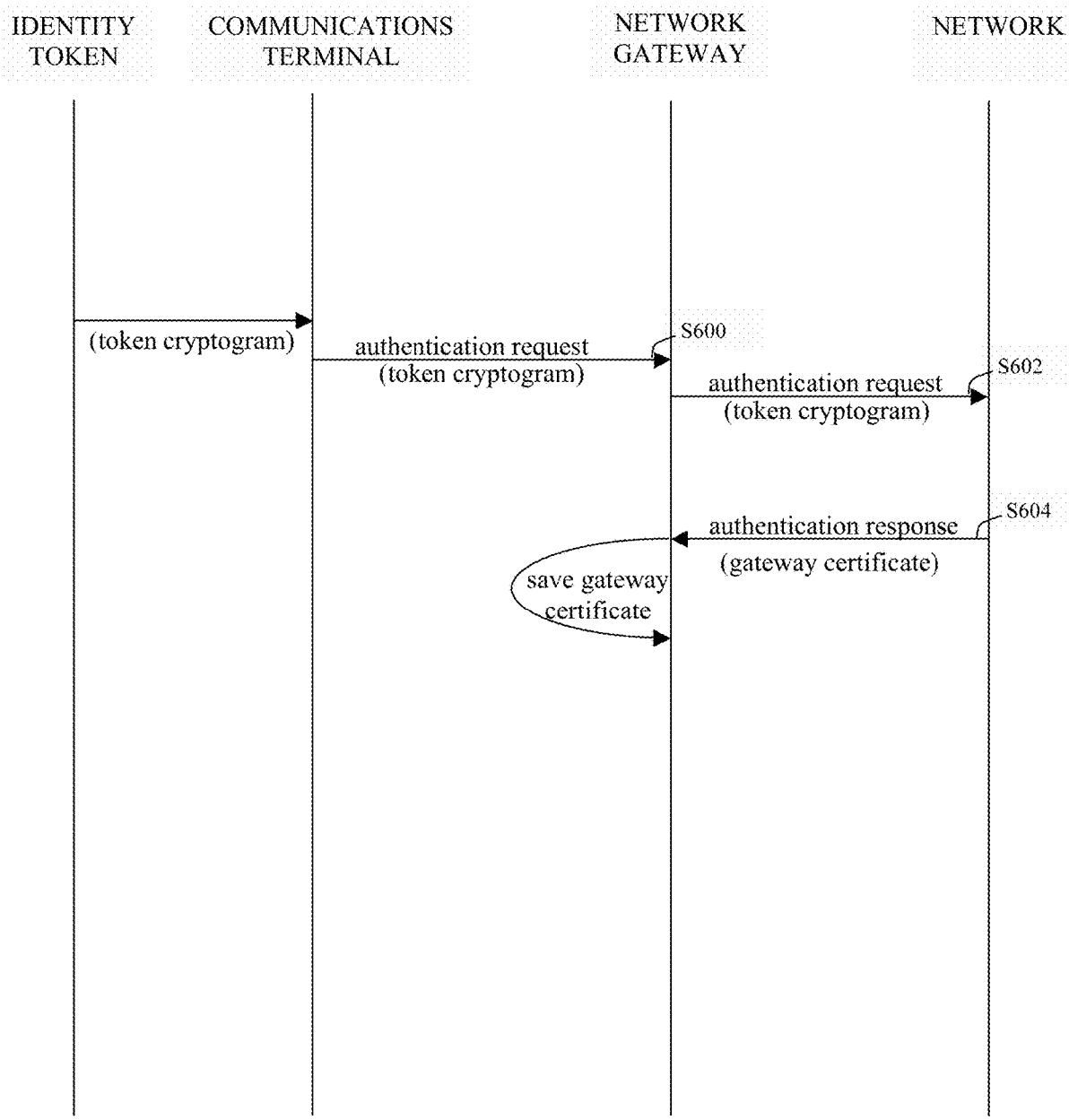
FIG. 6 is a message flow diagram that depicts, by way of overview, the network gateway authenticating method implemented by the authentication network.

As discussed, the network gateway 400 implements a method of network gateway authenticating. A sample embodiment of the network gateway authenticating method is depicted in FIG. 6.

As shown therein, at step S600 the network gateway 400 receives an authentication request from a payment terminal 200. The authentication request includes a token cryptogram that is generated from a cryptographic key that is stored on a hardware token 210 that is interfaced with the payment terminal 200. Optionally, the authentication request may include one or more of the administrator credentials.

At step S602, the network gateway 400 transmits the authentication request to a communications network. At step S604, the network gateway 400 receives an authentication response from the communications network in response to a validity of the token cryptogram, and saves the authentication response. The authentication response includes a gateway authentication certificate which the network gateway 400 uses to authenticate to a network device of the communications network.

A network device of the communications network may determine the validity of the token cryptogram (for example, by verifying that the token cryptogram was generated from a cryptographic key stored on the hardware token 210), and the authentication response may be transmitted to the network gateway 400 in accordance with the determined validity.

Where the authentication request includes an administrator credential, optionally the network gateway 400 may associate the administrator credential with the gateway authentication certificate. Thereafter, if the network gateway 400 receives an administrator credential from the payment terminal 200, the network gateway 400 may use the received administrator credential and the associated gateway authentication certificate to authenticate to the network device of the communications network.

For example, as discussed above with reference to step S506, the payment terminal 200 may receive a terminal authentication certificate that is configured to facilitate authentication of the payment terminal 200 to the network gateway 400. After step S604, the operator of the payment terminal 200 may transmit a validation request to the network gateway 400 requesting authentication of the payment terminal 200 to a network device of the communications network (e.g. the network device 500 of the second computer network 104). The network gateway 400 may facilitate authentication of the payment terminal 200 to the network device of the communications network via the gateway authentication certificate and the validation request.

As a more detailed example, the validation request may include an administrator credential, and the payment terminal 200 may transmit the validation request to the network gateway 400 after using the terminal authentication certificate to authenticate to the network gateway 400. The network gateway 400 may use the validation request to locate the gateway authentication certificate that is associated with the administrator credential, and then use the located gateway authentication certificate to authenticate to the network device of the communications network.

Transaction Processing—Overview

Figure 7:
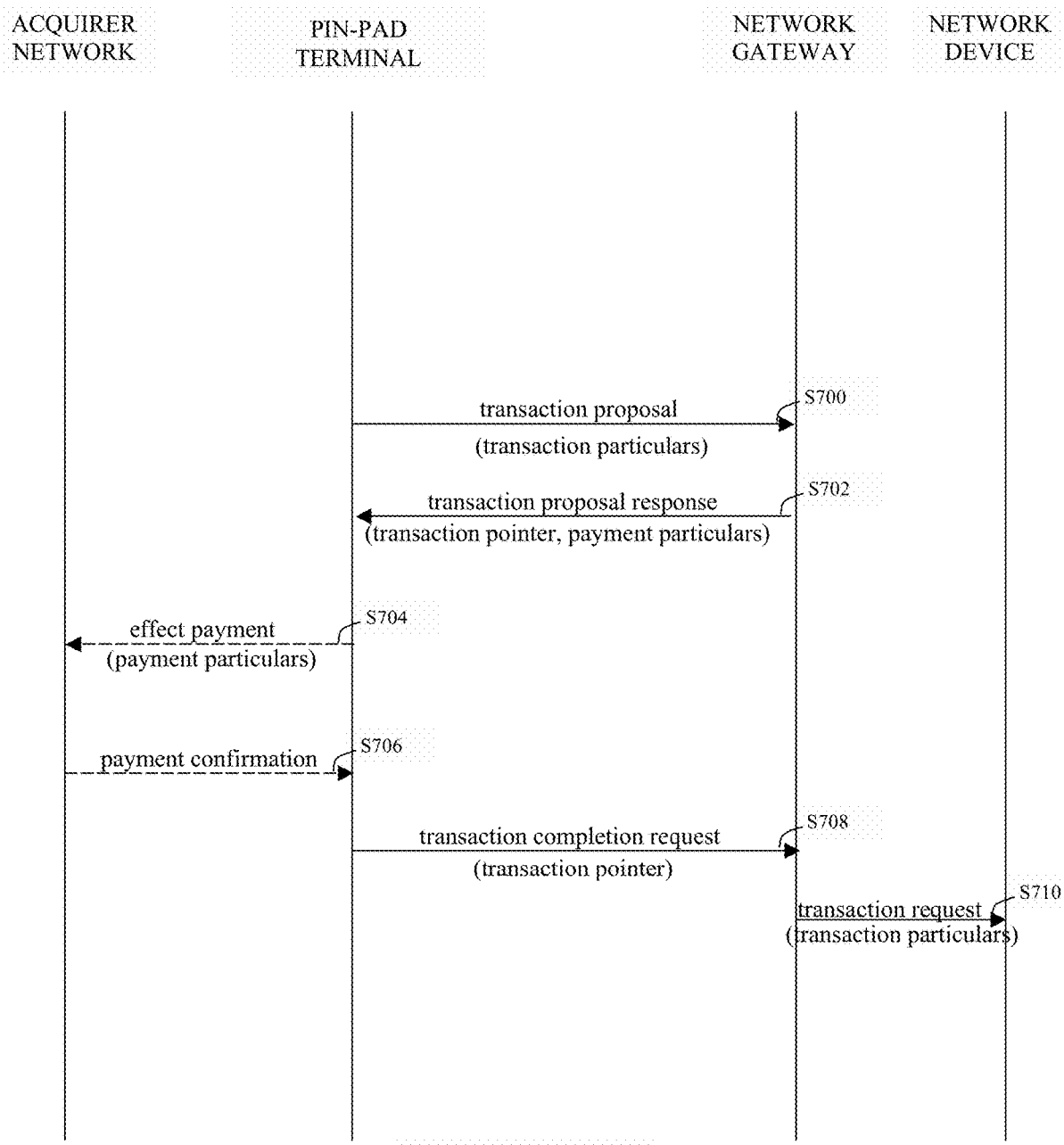
FIG. 7 is a message flow diagram that depicts, by way of overview, the transaction completion method implemented by the authentication network.

As discussed, the network gateway 400 also implements a method for completing a transaction with a network device. A sample embodiment of the transaction completion method is depicted in FIG. 7. In this embodiment, the payment terminal 200 may be implemented as a pin-pad terminal that is communication with an electronic cash register (ECR) 250.

As shown therein, at step S700 the payment terminal 200 transmits a transaction proposal to the network gateway 400 via the first computer network 102. The transaction proposal identifies a transaction that the operator of the payment terminal 200 proposes to engage in with a network device.

The network gateway 400 is configured to authenticate to the network device via a second computer network that comprises the network device. For example, as discussed above, at step S604 the network gateway 400 may receive a gateway authentication certificate which the network gateway 400 can use to authenticate to a network device of the communications network. Accordingly, the transaction proposal may identify a proposed transaction with the network device 500 of the second computer network 104.

At step S702, the payment terminal 200 receives from the network gateway 400 a transaction proposal response in response to the transaction proposal. The transaction proposal response specifies a pointer to the proposed transaction. The transaction proposal response may also identify the payment particulars for the proposed transaction.

At step S704, the payment terminal 200 may transmit over the acquirer network 106 payment particulars for effecting payment for the proposed transaction. At step S706, the payment terminal 200 may receive from the acquirer network 106 a payment confirmation in response to the payment particulars. However, these latter two steps are not essential; the operator of the payment terminal 200 may effect payment for the proposed transaction without engaging the acquirer network 106. For example, the operator may pay cash for the proposed transaction, or may use a terminal other than the payment terminal 200 to effect payment for the proposed transaction.

After payment is provided for the proposed transaction, at step S708 the payment terminal 200 initiates completion of the proposed transaction by generating a transaction completion request and transmitting the transaction completion request to the network device via the network gateway 400. The payment terminal 200 generates the transaction completion request from the transaction pointer that was received at step S702. By virtue of the transaction completion request, the payment terminal 200 requests completion of the proposed transaction with the network device.

To complete the transaction, the network gateway 400 may generate a transaction request message from the transaction completion request, and transmit the transaction request message to the network device via the second computer network 104, at step S710. The transaction request message may include the administrator credential and identify the particulars of the proposed transaction.

Transaction Processing Method—Detailed Discussion

One implementation of the authentication network 100 will now be discussed with reference to FIGS. 8 to 14. In this implementation, the second computer network 104 comprises a wide area network, such as the Internet, and the network device 500 is implemented as a computer (lottery) server that facilitates lottery ticket sales via the second computer network 104. Each payment terminal 200 is configured as an integrated (dumb) or semi-integrated (smart) pin-pad terminal that is connected to a respective ECR 250 and is deployed in a respective checkout lane of the merchant's store. Customers in the merchants' stores use the pin-pad terminals 200 to pay for goods/services that are being offered for sale by the merchant, and to purchase lottery tickets from the lottery server 500.

The operator of the lottery provides each merchant with a smartcard 210 that is configured with the unique administrator credentials (sysID and administrator passcode). The lottery server 500 is in communication with a token database that saves the administrator credentials and public cryptographic key associated with each smartcard 210.

The administrator of the terminal management server 350 may provide each merchant with a physical document that specifies the unique terminal ID and unique activation code for each of the merchant's pin-pad terminals 200. Alternately, the terminal management server 350 may download the terminal ID and activation code to each of the respective pin-pad terminals 200 via the network gateway 300.

The database of the terminal management server 350 stores the terminal credentials (unique terminal ID and terminal serial number) of each pin-pad terminal 200. The memory 214 of each pin-pad terminal 200 is pre-configured with a terminal serial number and with the authentication certificate of the certificate server 300. The administrator of the terminal management server 350 may ensure that each terminal ID, terminal serial number and activation code is uniquely associated with the respective pin-pad terminal 200 by employing any suitable database and/or cryptographic technique known in the art, including generating each terminal ID, terminal serial number and activation code from a pseudo-random number generator or noise generator. Alternately, or additionally, the administrator may confirm that each terminal ID and terminal serial number is unique within the database of the terminal management server 350. Similarly, the administrator may save each activation code in a secure database only after confirming that the administrator has not previously assigned the activation code to a pin-pad terminal 200.

1. Terminal Activation

Figure 8:
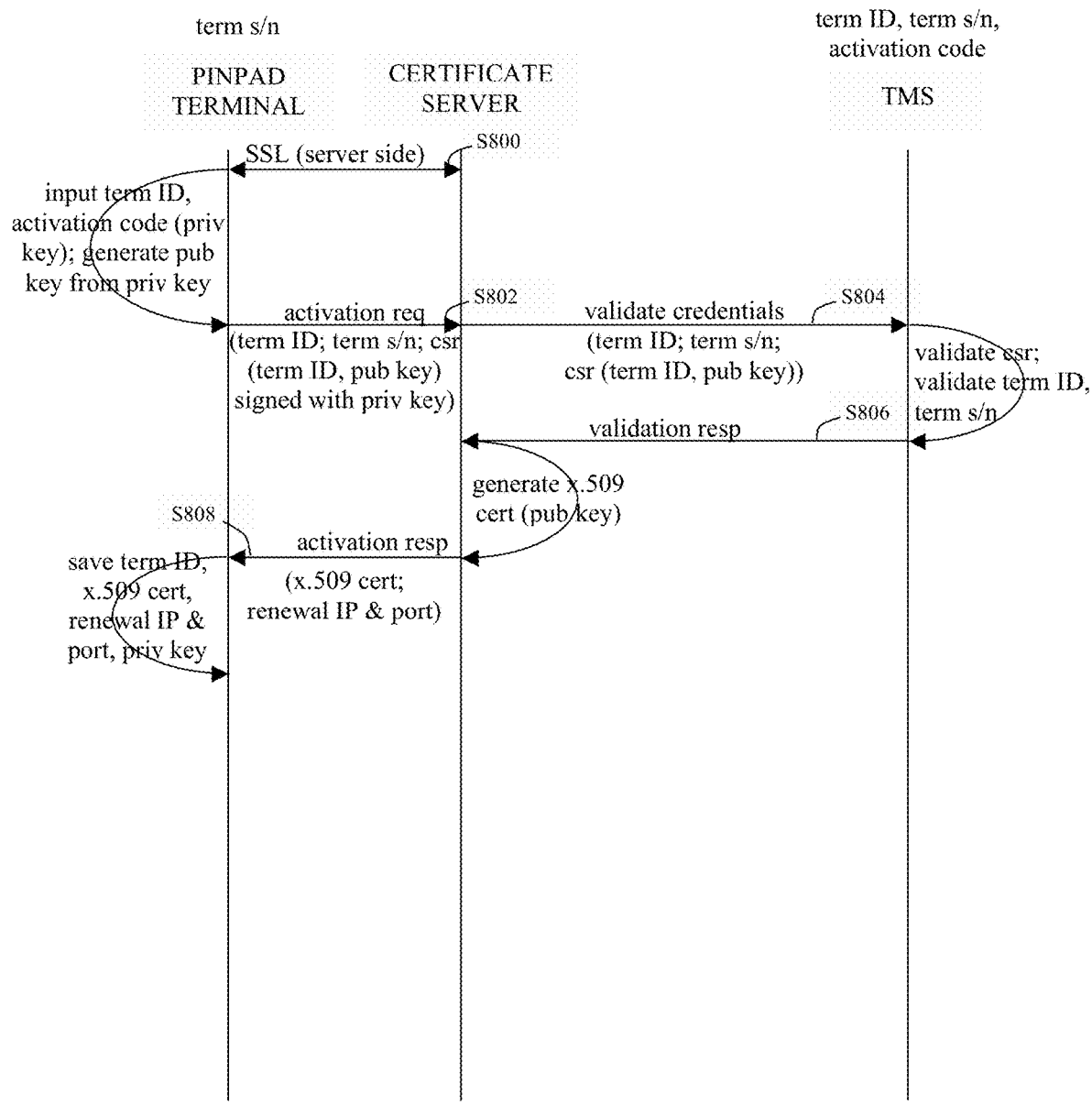
FIG. 8 is a detailed message flow diagram that depicts a sample embodiment of the terminal activation method implemented by the authentication network.
Figure 9:
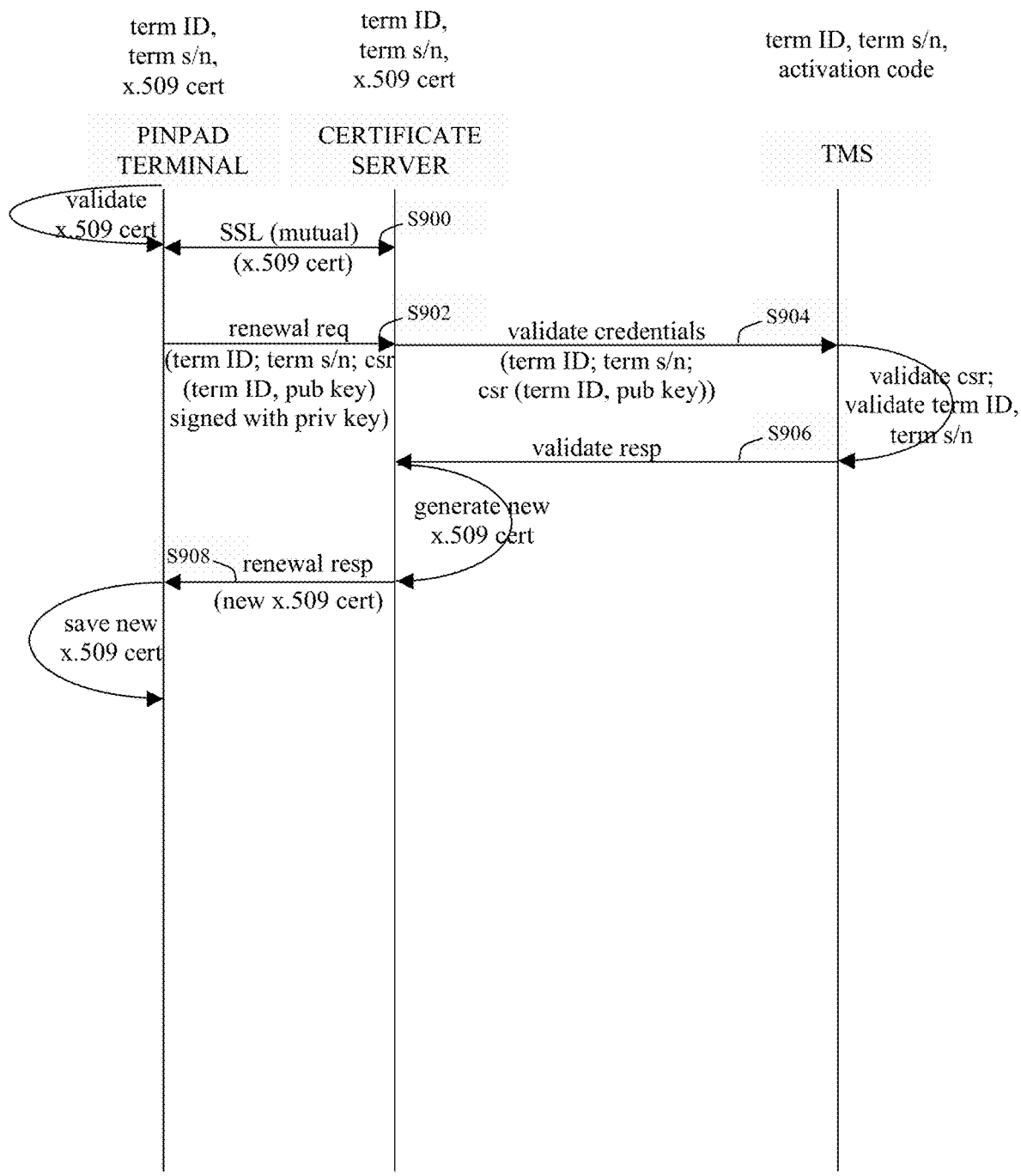
FIG. 9 a detailed message flow diagram that depicts a sample embodiment of the certificate renewal method implemented by the authentication network.

To allow the merchant to use the pin-pad terminals 200 within the authentication network 100, the merchant executes the terminal activation method, depicted in FIG. 8, to thereby provide each pin-pad terminal 200 with a respective terminal authentication certificate that the pin-pad terminal 200 can use to authenticate to the network gateway 400. In this implementation of the terminal activation method, the administrator of the terminal management server 350 provides each merchant with a physical document that specifies the unique terminal ID and unique activation code for each of the merchant's pin-pad terminals 200.

At step S800, the merchant applies power to the pin-pad terminal 200 (by connecting the pin-pad terminal 200 to the associated ECR 250, for example), and the pin-pad terminal 200 establishes an encrypted channel with the certificate server 300. Typically, the pin-pad terminal 200 uses the authentication certificate of the certificate server 300 to establish a server-side SSL connection with the certificate server 300.

The merchant may use the data input device 202 to select the terminal activation method from a menu of available methods. The terminal authentication processor 218 of the pin-pad terminal 200 prompts the merchant to input the terminal ID and activation code (private cryptographic key) into the pin-pad terminal 200. The merchant manually inputs the requested terminal ID and activation code into the pin-pad terminal 200 via the data input device 202.

In response, the terminal authentication processor 218 generates a terminal activation request message from the terminal credentials (unique terminal ID (input via the data input device 202) and terminal serial number (stored in the memory 214 of the pin-pad terminal 200)) and the activation code. The terminal activation request message includes the terminal ID, terminal serial number, and a public cryptographic key which the terminal authentication processor 218 generates from the activation code. The public cryptographic key and the activation code comprise an asymmetric cryptographic key pair.

The terminal activation request also includes a certificate signing request (CSR) that the terminal authentication processor 218 generates from the terminal credentials. In one example, the certificate signing request includes the terminal ID and the public cryptographic key and is digitally-signed using the activation code. The terminal activation request may also include an encrypted message authentication code (e.g. HMAC) that is generated from the terminal serial number and the certificate signing request.

At step S802, the pin-pad terminal 200 transmits the terminal activation request to the certificate server 300. The certificate server 300 then determines the validity of the terminal activation request. To do so, at step S804 the certificate generator 314 may transmit the terminal activation request to the terminal management server 350, requesting that the terminal management server 350 validate the terminal credentials included in the terminal activation request. In response, the terminal management server 350 may query its database with the terminal credentials to verify that the terminal credentials are associated with a common pin-pad terminal 200 (i.e. the terminal credentials are associated with a legitimate pin-pad terminal 200). The terminal management server 350 may respond to the certificate server 300 with a validation response, at step S806.

The certificate server 300 may also determine the validity of the terminal activation request by verifying the digital signature on the terminal activation request. To do so, the certificate generator 314 uses the public cryptographic key that was included with the certificate signing request to verify that the certificate signing request was signed using the activation code (and, therefore, that the public cryptographic key and the activation code comprise an asymmetric cryptographic key pair).

If the certificate server 300 determines that the terminal activation request is valid, the certificate generator 314 generates an activation response message that includes a terminal authentication certificate that the pin-pad terminal 200 can use to authenticate to the network gateway 400. The certificate generator 314 generates the terminal authentication certificate from the public cryptographic key of the certificate signing request, and signs the terminal authentication certificate with the private cryptographic key assigned to the certificate server 300. The terminal authentication certificate may be a X.509 digital certificate and, therefore, may specify an expiry date that is a predetermined number of days after the current date. The certificate generator 314 may insert, into the activation response message, the (renewal) network address (e.g. IP address and/or port number) of the certificate server 300 at which the pin-pad terminal 200 can transmit certificate renewal requests. Otherwise, the certificate server 300 generates an activation response message that indicates that the terminal activation request is invalid.

The certificate server 300 transmits the activation response message to the pin-pad terminal 200, in response to the activation request message, at step S808. In response, the terminal authentication processor 218 may verify that the terminal authentication certificate was digitally-signed by the certificate server 300, and then saves the terminal authentication certificate in the memory 214, together with the terminal ID, the activation code, and the renewal network address. Thereafter, the pin-pad terminal 200 may use the terminal authentication certificate to authenticate to the network gateway 400.

2. Terminal Certificate Renewal

The pin-pad terminals 200 may authenticate to the network gateway 400 whenever customers attempt to use the pin-pad terminals 200 to purchase lottery tickets from the lottery server 500. The pin-pad terminals 200 may also authenticate to the network gateway 400 in order to set up the network gateway 400 and, optionally, to register the pin-pad terminals 200 with the lottery server 500. Therefore, the pin-pad terminal 200 may periodically execute the certificate renewal method, depicted in FIG. 9, to ensure that the terminal authentication certificate remains valid. Unlike the terminal activation method, the gateway setup method, the terminal registration method and the transaction request method described herein, the pin-pad terminals 200 may execute the certificate renewal method automatically (i.e. without being invoked by the merchant) and transparently (i.e. without notification to the merchant).

At the outset of the certificate renewal method, the terminal authentication processor 218 determines the expiry date of the terminal authentication certificate. If the expiry date reveals that the terminal authentication certificate has expired, the certificate renewal method terminates and the pin-pad terminal 200 will thereafter not re-attempt to authenticate to or otherwise communicate with the network gateway 400, at least until the merchant re-executes the terminal activation method with a new activation code.

However, if the expiry date of the terminal authentication certificate falls within a predetermined time frame after the current date, at step S900 the terminal authentication processor 218 establishes an encrypted communications channel with the certificate server 300 using the renewal network address (e.g. IP address and/or port number) specified in the activation response message. Typically, the terminal authentication processor 218 uses the terminal authentication certificate to establish a mutually-authenticated SSL connection with the certificate server 300.

The terminal authentication processor 218 then generates a certificate renewal request message from the terminal credentials and the activation code. The certificate renewal request message may include the public cryptographic key and the terminal credentials. In one example, the certificate renewal request comprises a certificate signing request (CSR) that includes the terminal ID and the public cryptographic key and is digitally-signed using the activation code that was saved in the memory 214.

At step S902, the pin-pad terminal 200 transmits the certificate renewal request to the certificate server 300 over the encrypted channel. The certificate server 300 then determines the validity of the certificate renewal request. To do so, at step S904, the certificate generator 314 may transmit the certificate renewal request to the terminal management server 350, requesting that the terminal management server 350 to validate the terminal credentials included in the certificate renewal request. In response, the terminal management server 350 may query its database with the terminal credentials to verify that the terminal credentials are associated with a common pin-pad terminal 200 (i.e. the terminal credentials are associated with a legitimate pin-pad terminal 200).

As will be discussed below, suspicious or fraudulent activity involving the pin-pad terminal 200 may have been reported to the operator of the terminal management server 350. Accordingly, the terminal management server 350 may also query its database with the terminal credentials to verify that the terminal authentication certificate has not been revoked.

If the terminal management server 350 determines that the terminal credentials are associated with a legitimate pin-pad terminal 200, and that the terminal authentication certificate has not been revoked, the terminal management server 350 responds to the certificate server 300 with a validation response, at step S906, indicating that the terminal credentials were successfully validated. Otherwise, the terminal management server 350 responds to the certificate server 300 with a validation response indicating that validation of the terminal credentials failed.

The certificate server 300 may also determine the validity of the certificate renewal request by verifying the digital signature on the certificate renewal request. To do so, the certificate generator 314 uses the public cryptographic key that was included with the certificate signing request to verify that the certificate signing request was signed using the activation code.

If the certificate server 300 determines that the certificate renewal request (and the terminal credentials included therein) are valid, the certificate generator 314 generates a certificate renewal response message that includes a renewed terminal authentication certificate. The certificate generator 314 generates the renewed terminal authentication certificate from the public cryptographic key of the certificate signing request, and signs the terminal authentication certificate with the private cryptographic key assigned to the certificate server 300. The renewed terminal authentication certificate may be a X.509 digital certificate and, therefore, may specify an expiry date that is a predetermined number of days after the current date. Otherwise, the certificate server 300 generates a certificate renewal response message that indicates that the certificate renewal request is invalid.

The certificate server 300 transmits the certificate renewal response message to the pin-pad terminal 200, in response to the certificate renewal request, at step S908. In response, the terminal authentication processor 218 verifies that the renewed terminal authentication certificate was signed by the certificate server 300, and then replaces the terminal authentication certificate in the memory 214 with the renewed terminal authentication certificate. Thereafter, the pin-pad terminal 200 uses the renewed terminal authentication certificate to authenticate to the network gateway 400.

3. Gateway Setup

Figure 10:
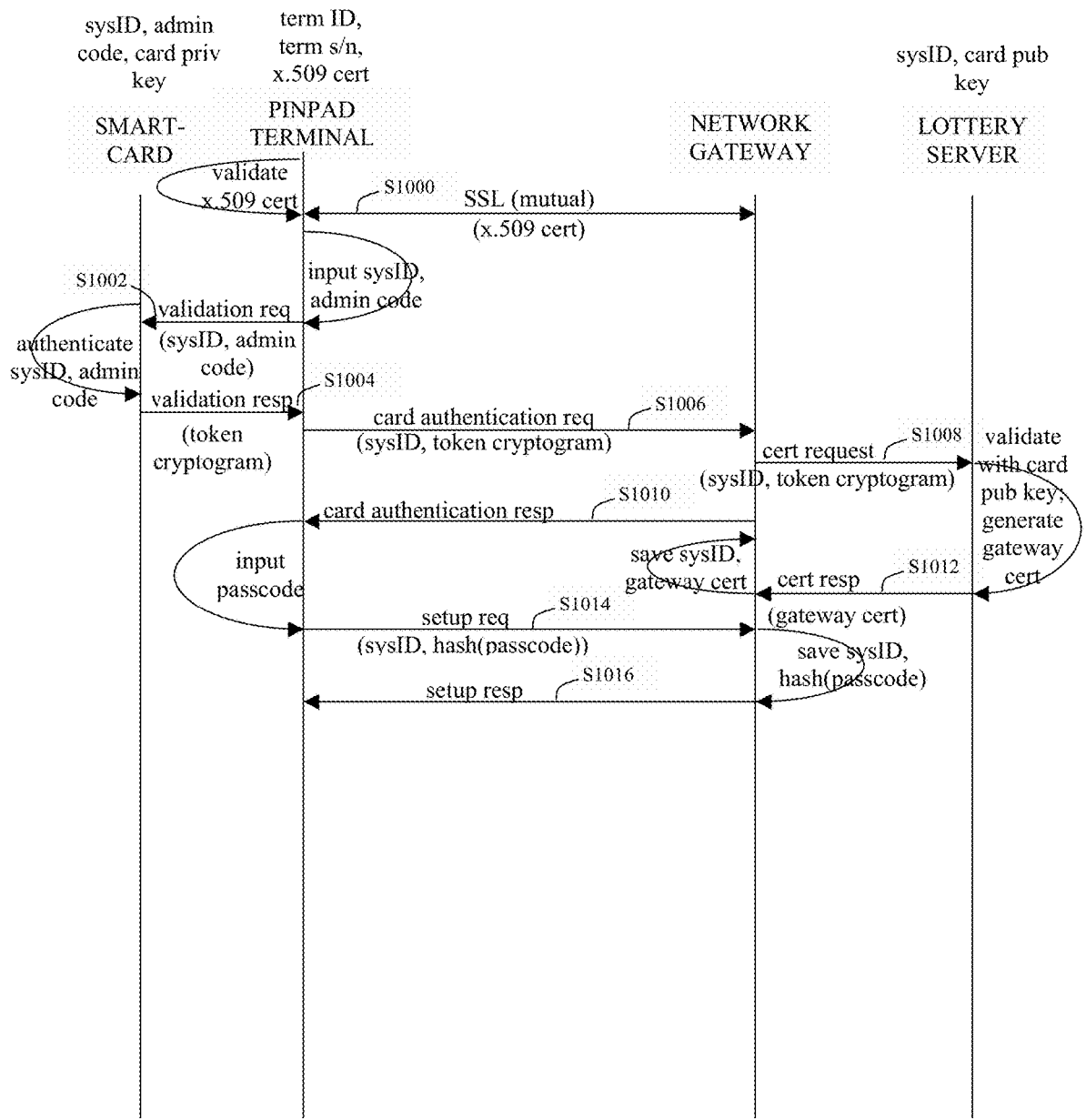
FIG. 10 is a detailed message flow diagram that depicts a sample embodiment of the gateway setup method implemented by the authentication network.

After activating the pin-pad terminal 200, the merchant executes the gateway setup method, depicted in FIG. 10, to thereby provide the network gateway 400 with a gateway authentication certificate that the network gateway 400 can use to authenticate to the lottery server 500 of the second computer network 104. Optionally, the gateway setup method also installs in the network gateway 400 a gateway credential which the pin-pad terminal 200 can use to allow the merchant to access and configure the network gateway 400.

The merchant may use the data input device 202 to select the gateway setup method from the menu of available methods. If the terminal authentication processor 218 determines from the expiry date of the terminal authentication certificate that the terminal authentication certificate is still valid and does not need to be renewed, the terminal authentication processor 218 uses the authentication certificate to establish an encrypted channel with the network gateway 400, at step S1000. As part of this authentication step, the network gateway 400 may validate the terminal authentication certificate by confirming that the terminal authentication certificate was signed with the private cryptographic key of the certificate server 300, and may also confirm that the terminal ID identified on the terminal authentication certificate is associated with a pin-pad terminal 200 in the database of the terminal management server 350.

The terminal authentication processor 218 of the pin-pad terminal 200 then prompts the merchant to interface a hardware token with the pin-pad terminal 200 and to input one or more administrator credentials (e.g. sysID, administrator passcode) into the pin-pad terminal 200. The merchant interfaces the supplied smartcard 210 with the token interface 209 of the pin-pad terminal 200, and then uses the data input device 202 to input the required administrator credentials into the pin-pad terminal 200. In response, the terminal authentication processor 218 generates a credential validation request message that includes the administrator credential(s). The terminal authentication processor 218 transmits the credential validation request to the smartcard 210, at step S1002.

In response, the smartcard 210 may compare the administrator credentials that were received in the credential validation request with the administrator credentials that are saved in the protected memory of the smartcard 210. If the received administrator credentials match the saved administrator credentials, the smartcard 210 may generate a token cryptogram from the administrator credentials and the private cryptographic key saved in the smartcard 210. Alternately, the smartcard 210 may generate the token cryptogram without comparing the administrator credentials with the saved administrator credentials.

The smartcard 210 then generates a credential validation response that includes the token cryptogram. Otherwise, the smartcard 210 may generate a credential validation response that indicates that the received administrator credentials are invalid. The smartcard 210 transmits the credential validation response to the pin-pad terminal 200, in response to the credential validation request, at step S1004.

If the credential validation response includes a token cryptogram, the terminal authentication processor 218 generates a card authentication request message that includes the administrator credentials and the token cryptogram. The terminal authentication processor 218 then transmits the card authentication request to the network gateway 400 over the encrypted channel, at step S1006. The smartcard 210 may generate the token cryptogram from the administrator sysID and the token private cryptographic key and, therefore, the card authentication request may include the administrator sysID and the token cryptogram.

The gateway authenticator 414 of the network gateway 400 generates a certificate request message that includes the token cryptogram and associated administrator credential(s), and transmits the certificate request message to a network device (lottery server) 500 of the second computer network, at step S1008. In response, the lottery server uses the administrator credential(s) of the certificate request message to locate the public cryptographic key that is associated with the smartcard 210. The lottery server then validates the token cryptogram of the certificate request message using the located public cryptographic key, thereby verifying that the token cryptogram was generated from the administrator credentials and from the private cryptographic key that is associated with the smartcard 210.

If the lottery server determines that the token cryptogram is valid, the lottery server generates a certificate response message that includes a gateway authentication certificate that the network gateway 400 can use to authenticate to the lottery server. The lottery server signs the gateway authentication certificate with the private cryptographic key assigned to the lottery server, and may also associate the gateway authentication certificate with the administrator credential(s) that were included with the certificate request message. Otherwise, the lottery server generates a certificate response message that indicates that the token cryptogram is invalid. The lottery server transmits the certificate response message to the network gateway 400, in response to the certificate request message, at step S1010.

The gateway authenticator 414 may verify that the gateway authentication certificate was digitally-signed by the lottery server, and then saves the gateway authentication certificate, together with the administrator credentials that were included in the card validation request. The gateway authenticator 414 may associate the gateway authentication certificate with the administrator sysID. Thereafter, the network gateway 400 can use the gateway authentication certificate to authenticate to the lottery server.

The gateway authenticator 414 then generates a card authentication response, indicative of the validity of the token cryptogram. The gateway authenticator 414 transmits the card validation response to the pin-pad terminal 200, in response to the card authentication request, at step S1012.

Optionally, the terminal authentication processor 218 of the pin-pad terminal 200 may then prompt the merchant to input into the pin-pad terminal 200 a new credential (e.g. a gateway passcode) which the merchant would like to use to access and configure the network gateway 400. The merchant uses the data input device 202 to input the new credential (gateway passcode) into the pin-pad terminal 200. In response, the terminal authentication processor 218 computes a hash code from the gateway passcode, and generates a security setup request message that includes the administrator sysID and hashed gateway passcode. The terminal authentication processor 218 transmits the security setup request to the network gateway 400, at step S1014.

The gateway authenticator 414 validates the security setup request by verifying that the network gateway 400 has already associated the administrator sysID (included in the security setup request message) with a gateway authentication certificate. If the gateway authenticator 414 is able to locate a corresponding gateway authentication certificate, the gateway authenticator 414 associates the hashed gateway passcode with the saved administrator sysID and the associated gateway authentication certificate, and generates a security setup response message, indicative of the validity of the administrator sysID. Otherwise, the gateway authenticator 414 generates a security setup response message that indicates that the security setup request failed.

The gateway authenticator 414 transmits the security setup response message to the pin-pad terminal 200, in response to the security setup request, at step S1016. If the security setup request was successfully validated, the merchant may thereafter use the administrator sysID and associated gateway passcode to access and configure the network gateway 400, as will be explained in the next section.

4. Terminal Validation—Optional

Figure 11:
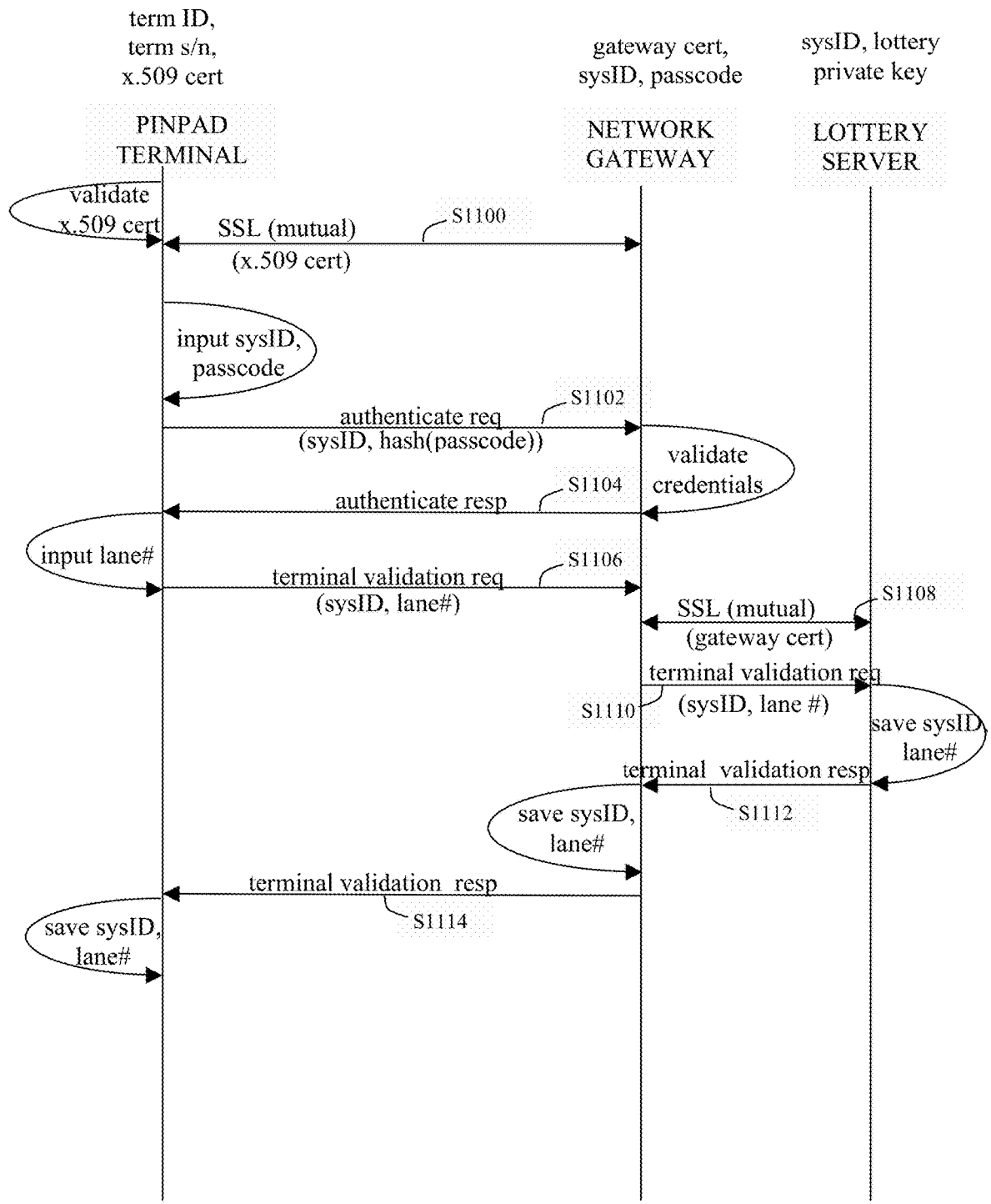
FIG. 11 is a detailed message flow diagram that depicts a sample embodiment of the terminal validation method implemented by the authentication network.
Figure 12:
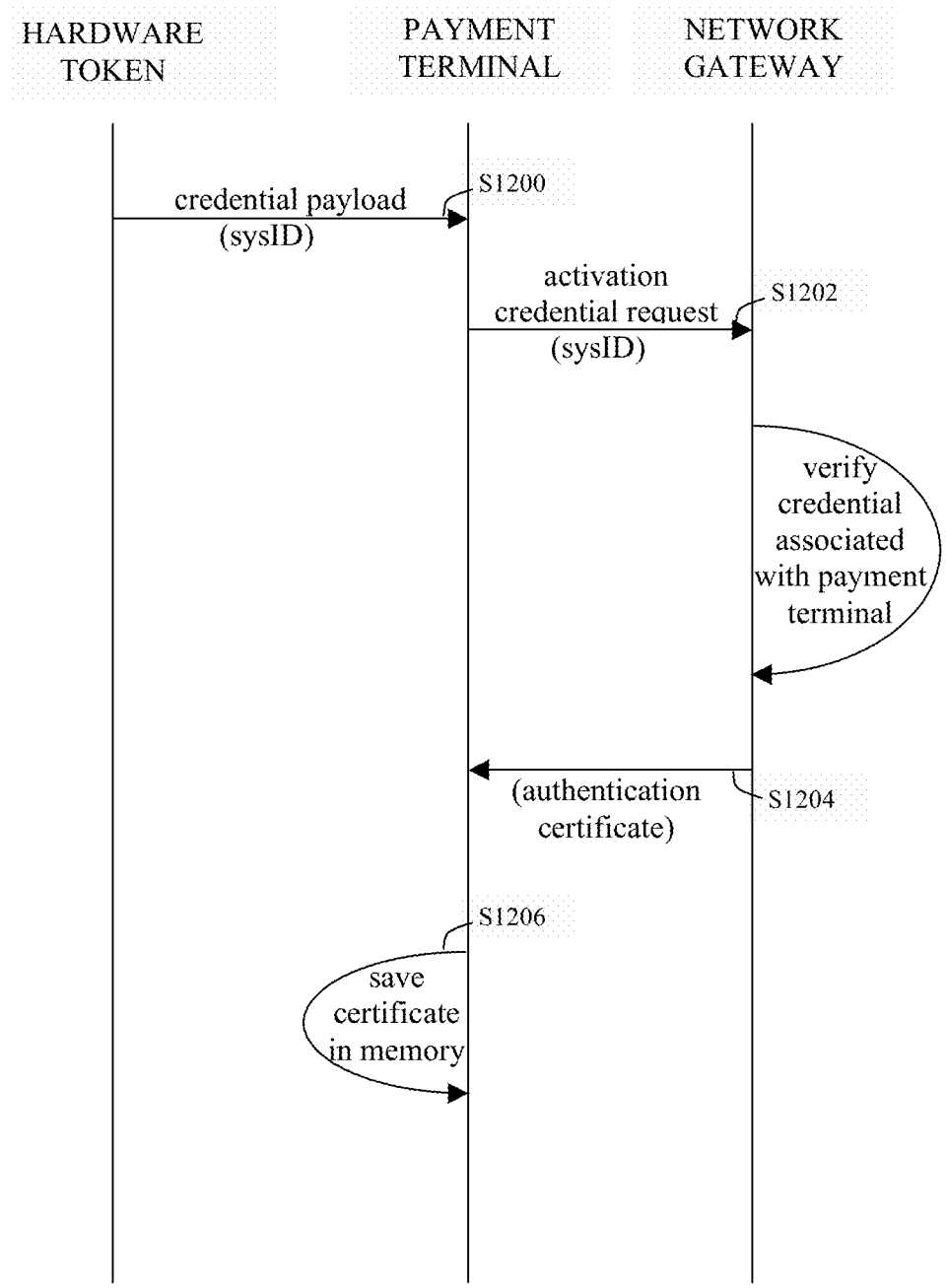
FIG. 12 is a message flow diagram that depicts, by way of overview, a simplified implementation of the terminal activation method.

The merchant may optionally execute the terminal validation method, depicted in FIG. 11, which registers the pin-pad terminals 200 with the lottery server. Registering the pin-pad terminals 200 allows the lottery server to subsequently verify the validity of the pin-pad terminal 200.

The merchant may use the data input device 202 to select the terminal validation method from the menu of available methods. If the terminal authentication processor 218 determines that the terminal authentication certificate is valid, the terminal authentication processor 218 establishes an encrypted channel with the network gateway 400, at step S1100. Typically, the terminal authentication processor 218 uses the terminal authentication certificate to establish a mutually-authenticated SSL connection with the network gateway 400. As part of this authentication step, the network gateway 400 may validate the terminal authentication certificate by confirming that the terminal authentication certificate was signed with the private cryptographic key of the certificate server 300, and may also confirm that the terminal ID identified on the terminal authentication certificate is associated with a pin-pad terminal 200 in the database of the terminal management server 350.

The terminal authentication processor 218 of the pin-pad terminal 200 then prompts the merchant to an input one or more credentials (e.g. administrator sysID and gateway passcode) into the pin-pad terminal 200. The merchant uses the data input device 202 to input the requested credentials into the pin-pad terminal 200. In response, the terminal authentication processor 218 computes a hash code from the gateway passcode, and generates an administrator authentication request message that includes the administrator sysID and hashed gateway passcode. The terminal authentication processor 218 transmits the administrator authentication request to the network gateway 400 over the encrypted channel, at step S1102.

The gateway authenticator 414 validates the administrator authentication request by verifying that the network gateway 400 has already associated the administrator sysID and hashed gateway passcode with a gateway authentication certificate. If the gateway authenticator 414 is able to locate a corresponding gateway authentication certificate, the gateway authenticator 414 generates an administrator authentication response message, indicative of the validity of the credentials. Otherwise, the gateway authenticator 414 generates an administrator authentication response message that indicates that the administrator authentication request failed.

If the administrator authentication request was successfully validated, the terminal authentication processor 218 prompts the merchant to input into the pin-pad terminal 200 a "local terminal credential" which the merchant would like to use to identify this particular pin-pad terminal 200. As used herein, a "local terminal credential" is a terminal credential that a merchant may use to uniquely identify one of the merchant's pin-pad terminals but which, in contrast to other terminal credentials (e.g. terminal serial numbers), are not necessarily unique amongst all merchants using the network gateway 400.

As discussed above, each pin-pad terminal 200 may be deployed in a respective checkout lane of the merchant's store. Accordingly, the merchant may use the data input device 202 to input the lane number (local terminal credential) into the pin-pad terminal 200. In response, the terminal authentication processor 218 generates a terminal validation request message that includes the administrator sysID and lane number. The terminal authentication processor 218 transmits the terminal validation request to the network gateway 400 over the encrypted channel, at step S1104.

The gateway authenticator 414 uses the administrator sysID (included in the terminal validation request message) to locate the corresponding gateway authentication certificate. If the gateway authenticator 414 is able to locate the corresponding gateway authentication certificate, the gateway authenticator 414 uses the located gateway authentication certificate to establish an encrypted communications channel with the lottery server via the second computer network 104, at step S1108. Typically, the gateway authenticator 414 uses the located gateway authentication certificate to establish a mutually-authenticated SSL connection with the lottery server. Otherwise, the gateway authenticator 414 generates a terminal validation response message that indicates that the terminal validation request failed.

If the gateway authenticator 414 is able to validate the terminal validation request, at step S1110 the gateway authenticator 414 transmits the terminal validation request to the lottery server over the encrypted channel that is established between the network gateway 400 and the lottery server. The lottery server may validate the terminal validation request by verifying that the lottery server has already associated the administrator sysID with the gateway authentication certificate (e.g. after step S1008 of the gateway setup method).

If the lottery server is able to validate the terminal validation request, the lottery server associates the administrator sysID with the specified lane number, and then generates a terminal validation response message, confirming successful validation of the terminal validation request. Otherwise, the lottery server generates a terminal validation response message that indicates that the terminal validation request failed. The lottery server transmits the terminal validation response message to the network gateway 400, at step S1112.

If the terminal validation request is successful, the gateway authenticator 414 associates the administrator sysID with the specified lane number. The gateway authenticator 414 then transmits the terminal validation response message to the pin-pad terminal 200, in response to the terminal validation request, at step S1114.

If the terminal validation request was successfully validated, the pin-pad terminal 200 saves the specified lane number in the memory 214, together with the administrator sysID.

The merchant typically executes the terminal validation method on each of the merchant's pin-pad terminals 200. Each pin-pad terminal 200 may thereafter use the administrator sysID and the pin-pad terminal's local terminal credential to identify itself to the lottery server. As will be demonstrated in the next section, the administrator sysID and associated local terminal credential allow the lottery server to confirm the validity of the pin-pad terminal 200.

5. Simplified Terminal Activation and Gateway Setup Methods

In the terminal activation method discussed above with reference to FIG. 8, the administrator of the terminal management server 350 provides each merchant with a physical document that specifies the unique terminal ID and unique activation code for each of the merchant's pin-pad terminals 200. A simplified terminal activation method, in which the terminal IDs and activation codes are downloaded to the respective pin-pad terminals 200, is depicted by way of overview in FIG. 12. As will become apparent, this variation incorporates aspects of the terminal activation method of FIG. 8, the gateway setup method of FIG. 10, and the terminal validation method of FIG. 11.

At step S1200 of the simplified terminal activation method, the payment terminal 200 receives a first administrator credential (e.g. sysID) from a hardware token 210 that is interfaced with the payment terminal 200, and generates an activation credential request from the first administrator credential. The payment terminal 200 transmits the activation credential request to the network gateway 400, at step S1202.

The network gateway 400 then verifies that, before the payment terminal 200 received the first administrator credential from the hardware token 210, the first computer network 102 associated the first administrator credential with the payment terminal 200. At step S1204, the payment terminal 200 receives a digital authentication certificate from the first computer network 102. The payment terminal 200 saves the digital authentication certificate in the memory 214 of the payment terminal 200, at step S1206. As discussed, the digital authentication certificate facilitates authentication of the payment terminal 200 to the second computer network 104 via the network gateway 400.

Figure 13:
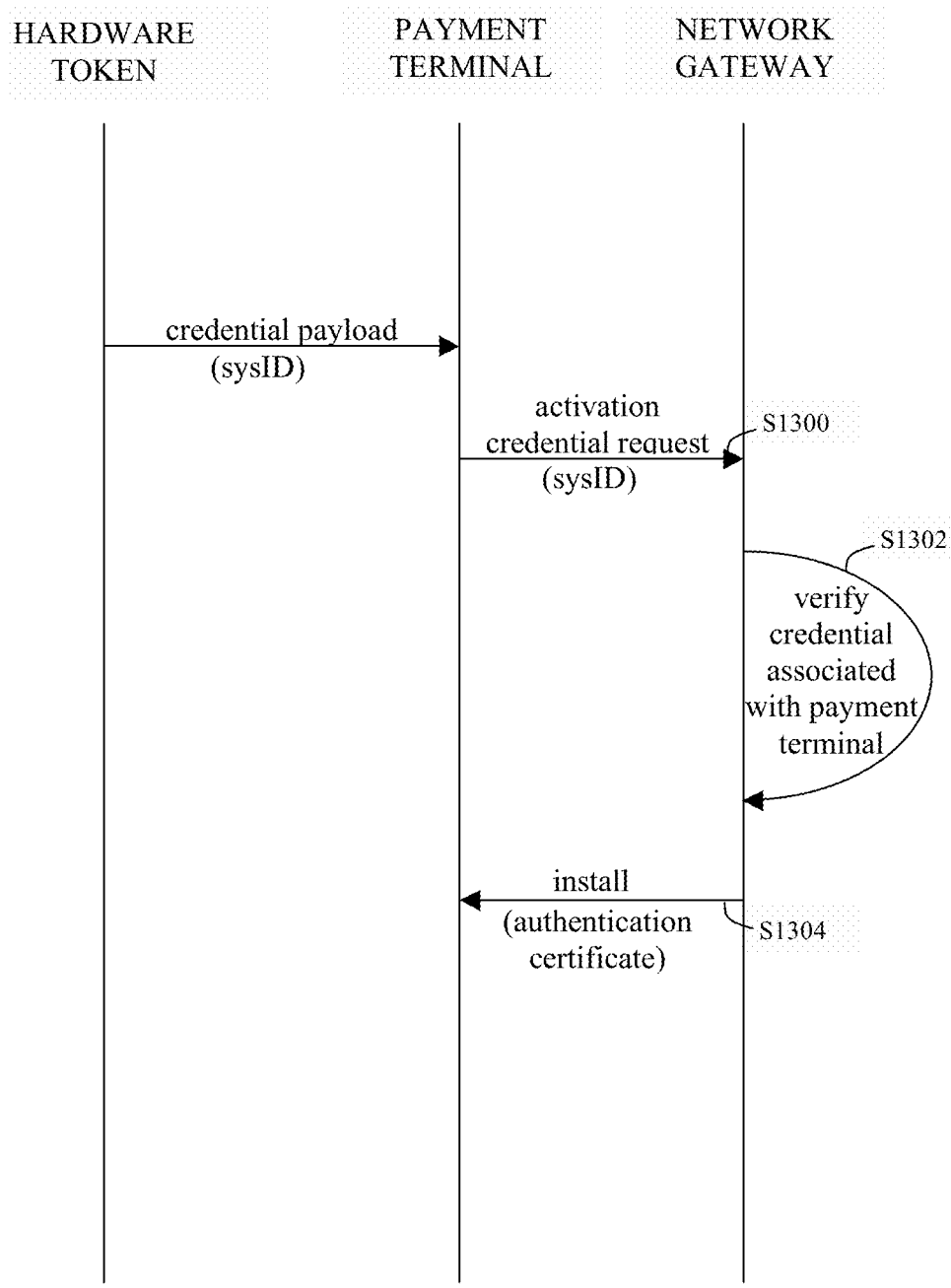
FIG. 13 is a message flow diagram that depicts, by way of overview, a simplified implementation of the gateway setup method.

A simplified gateway setup method, in which the network gateway 400 downloads the terminal IDs and activation codes to the pin-pad terminals 200, is depicted by way of overview in FIG. 13. Again, this variation incorporates aspects of the terminal activation method of FIG. 8, the gateway setup method of FIG. 10, and the terminal validation method of FIG. 11.

At step S1300 of the simplified gateway setup method, the network gateway 400 receives from the payment terminal 200 an activation credential request that includes a first administrator credential (e.g. sysID). The payment terminal 200 received the first administrator credential from a hardware token 210 that is interfaced with the payment terminal 200.

At step S1302, the network gateway 400 verifies that, before the payment terminal 200 received the first administrator credential from the hardware token 210, the first computer network 102 associated the first administrator credential with the payment terminal 200. At step S1304, the network gateway 400 installs a digital authentication certificate in the payment terminal 200. As discussed above, the digital authentication certificate facilitates authentication of the payment terminal 200 to the second computer network 104 via the network gateway 400.

6. First Simplified Terminal Activation and Gateway Setup Methods

Figure 14:
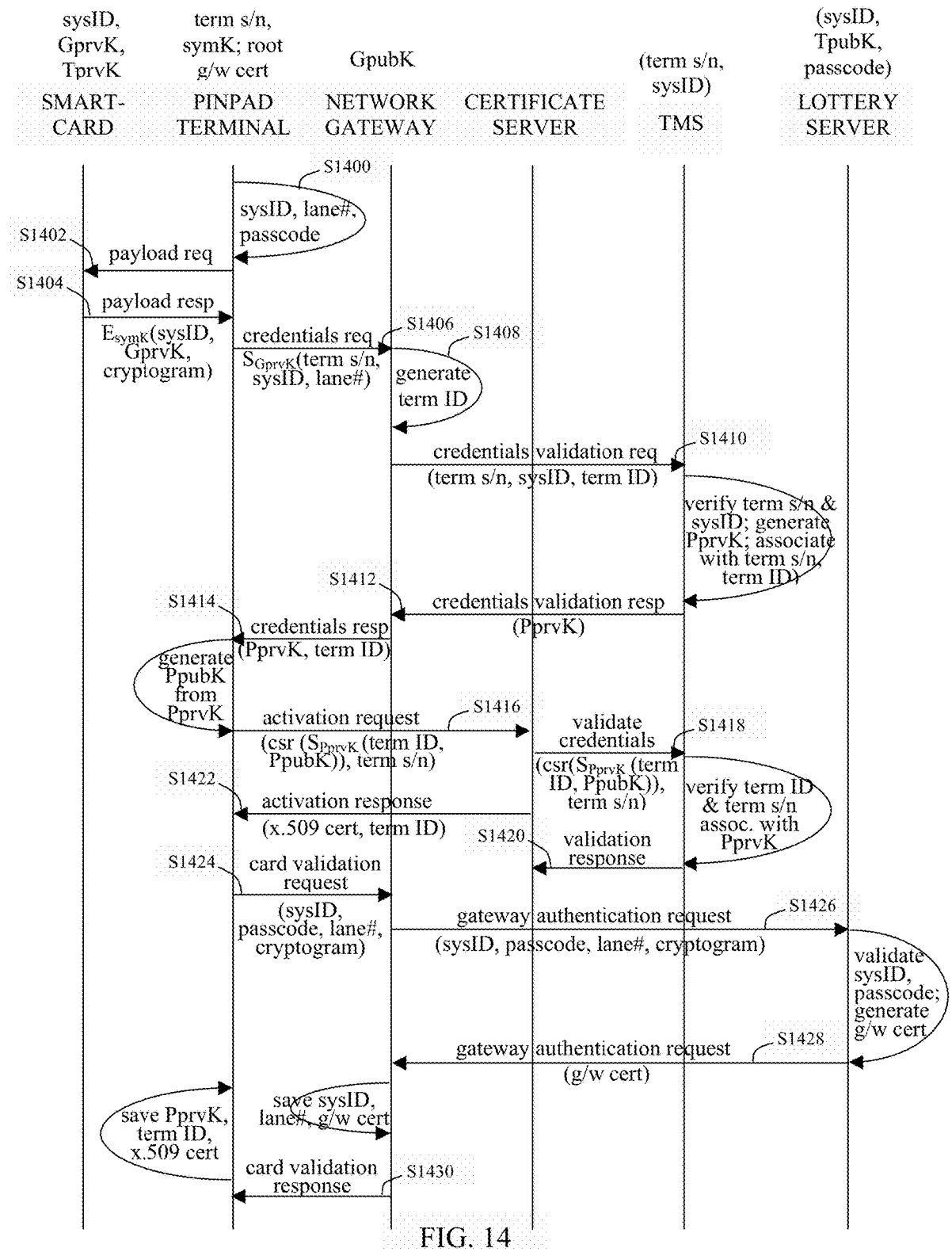
FIG. 14 is a detailed message flow diagram that depicts a first implementation of the simplified terminal activation and gateway setup methods.

One implementation of the simplified terminal activation and gateway setup methods will now be described, in detail, with reference to FIG. 14. In this implementation, the non-volatile memory 214 of each pin-pad terminal 200 is pre-configured with a terminal serial number that is uniquely associated with the pin-pad terminal 200, a symmetric cryptographic key symK, and a root public digital certificate of the network gateway 400. The smartcard 210 saves a token private cryptographic key TprvK and a credential payload in the protected memory thereof. The credential payload includes the administrator identifier sysID that was assigned to the smartcard 210 by the operator of the lottery server 500, and a gateway private cryptographic key GprvK (provided by the administrator of the network gateway 400). The credential payload may be stored in the smartcard 210 as a PKCS #12 container, the contents of which are encrypted with the same symmetric cryptographic key symK that is stored in the pin-pad terminal 200.

Each database record of the database maintained by the terminal management server 350 identifies a pair of credentials (terminal serial number, administrator identifier sysID) that are uniquely associated with the respective pin-pad terminal 200. The administrator of the terminal management server 350 may ensure that each terminal serial number is uniquely associated with the respective pin-pad terminal 200 by employing any suitable database and/or cryptographic technique known in the art, including generating each terminal serial number from a pseudo-random number generator or noise generator. Alternately, or additionally, the administrator may save each terminal serial number in the database only after confirming that the terminal serial number has not been previously saved in the database.

The network gateway 400 is configured with a gateway public cryptographic key GpubK corresponding to the gateway private cryptographic key GprvK of the credential payload, such that the gateway public cryptographic key GpubK and the gateway private cryptographic key GprvK constitute an asymmetric cryptographic key pair.

For each smartcard 210 issued by (or on behalf of) the administrator of the network device (lottery server) 500, the token database of the network device 500 saves the administrator identifier sysID, a hash of the associated administrator passcode, and the token public cryptographic key TpubK associated with the token private cryptographic key TprvK. The token public cryptographic key TpubK and the associated token private cryptographic key TprvK constitute an asymmetric cryptographic key pair.

The merchant uses the data input device 202 to select the terminal activation method from the menu of available methods. However, instead of the terminal authentication processor 218 of the pin-pad terminal 200 prompting the merchant to input the terminal ID and activation code into the pin-pad terminal 200 (as in the embodiment of FIG. 8), the terminal authentication processor 218 prompts the merchant to interface a hardware token with the pin-pad terminal 200 and to input administrator credentials (e.g. administrator identifier sysID, administrator passcode) and optionally a local terminal credential (e.g. lane number) into the pin-pad terminal 200.

The merchant interfaces the supplied smartcard 210 with the pin-pad terminal 200, and inputs the requested administrator credentials and optionally the local terminal credential into the pin-pad terminal 200 at step S1400. In response, the terminal authentication processor 218 saves the administrator credentials (and the local terminal credential, if provided) in the volatile memory 214, and generates a payload request message and transmits the payload request message to the smartcard 210, at step S1402.

The smartcard 210 generates a payload response message that includes the credential payload (administrator identifier sysID, gateway private cryptographic key GprvK), and may optionally also generate a token cryptogram from the administrator identifier sysID and the token private cryptographic key TprvK and include the token cryptogram in the payload response message. The smartcard 210 transmits the payload response message to the pin-pad terminal 200, in response to the payload request message, at step S1404.

In response, the pin-pad terminal 200 decrypts the credential payload with the symmetric cryptographic key symK stored in the pin-pad terminal 200, and compares the administrator identifier sysID that the merchant input into the pin-pad terminal 200 (at step S1400) with the administrator credential sysID of the credential payload. If the administrator identifier sysID that was input into the pin-pad terminal 200 at step S1400 does not match the administrator identifier sysID received from the smartcard 210, the pin-pad terminal 200 may purge from the memory 214 thereof the sysID, local terminal credential, terminal serial number, the symmetric cryptographic key symK, the credential payload, and the root public digital certificate of the network gateway 400.

Otherwise, if the administrator identifier sysID that was input into the pin-pad terminal 200 at step S1400 matches the administrator identifier sysID received from the smartcard 210, the merchant has thereby authenticated to the pin-pad terminal 200 via two authentication factors (administrator identifier sysID, possession of smartcard 210 associated with administrator identifier sysID), and the pin-pad terminal 200 then generates an activation credential request that includes the unique terminal serial number, the administrator identifier sysID and optionally the local terminal credential (lane number). Optionally, the pin-pad terminal 200 generates a hash from the administrator passcode, and includes the token cryptogram and the hash of the administrator passcode in the activation credentials request.

The pin-pad terminal 200 may sign the activation credentials request with the gateway private cryptographic key GprvK received from the credential payload. The pin-pad terminal 200 may use the root public digital certificate of the network gateway 400 to establish a server-side SSL connection with the network gateway 400, and then transmits the activation credentials request to the network gateway 400 over the encrypted channel at step S1406.

The network gateway 400 uses the gateway public cryptographic key GpubK to validate the signature of the activation credentials request. If the signature of the activation credentials request is invalid, the network gateway 400 may command the pin-pad terminal 200 to purge from the non-volatile memory 214 thereof the terminal serial number, the symmetric cryptographic key symK, the credential payload, and the root public digital certificate of the network gateway 400.

Otherwise, if the signature of the activation credentials request is valid, the merchant has thereby authenticated to the network gateway 400 (i.e. the merchant is in possession of the smartcard 210 that was used to (indirectly) sign the activation credentials request), and the network gateway 400 generates a unique terminal ID at step S1408, and generates an activation credential validation request message that includes the terminal serial number, administrator identifier sysID, and the terminal ID.

The network gateway 400 may ensure that the terminal ID is unique by employing any suitable database and/or cryptographic technique known in the art, including generating each terminal ID from a pseudo-random number generator or noise generator. The network gateway 400 may also include the local terminal credential (e.g. lane number) in the terminal ID.

The network gateway 400 forwards the activation credential validation request to the terminal management server 350, at step S1410, requesting that the terminal management server 350 validate the credentials (terminal serial number, administrator identifier sysID) included in the activation credential validation request.

The terminal management server 350 may validate the credentials included in the activation credential validation request by querying its database to determine whether the terminal serial number is associated with the administrator identifier sysID in the database. If the terminal management server 350 determines that the credentials included in the activation credential validation request are not associated with each other in the database of the terminal management server 350, the terminal management server 350 generates an activation credential validation response message that indicates that the credentials are invalid.

Otherwise, if the terminal management server 350 determines that the terminal serial number is associated with the administrator identifier sysID in the database of the terminal management server 350 (i.e. the credentials are valid and, therefore, were associated with a legitimate pin-pad terminal 200 before the pin-pad terminal 200 received the administrator identifier sysID from the smartcard 210), the terminal management server 350 generates a unique activation code (pin-pad private cryptographic key) PprvK, associates the activation code PprvK and the terminal ID with the terminal serial number and the administrator identifier sysID in the database (thereby uniquely associating the activation code PprvK with the merchant and the respective pin-pad terminal 200), and generates an activation credential validation response message that includes the activation code PprvK.

The terminal management server 350 may ensure that each activation code PprvK is uniquely associated with the respective pin-pad terminal 200 by employing any suitable database and/or cryptographic technique known in the art, including generating each activation code PprvK from a pseudo-random number generator or noise generator. Alternately, or additionally, the terminal management server 350 may save each activation code PprvK in the database only after confirming that the activation code PprvK has not previously been saved in the database.

At step S1412, the terminal management server 350 transmits the activation credential validation response to the network gateway 400. If the activation credential validation response indicates that the terminal management server 350 determined that the credentials (terminal serial number, administrator identifier sysID) included in the activation credentials request were invalid, the network gateway 400 may command the pin-pad terminal 200 to purge from the non-volatile memory 214 thereof the terminal serial number, the symmetric cryptographic key symK, the credential payload, and the public digital certificate of the network gateway 400.

Otherwise, if the activation credential response includes an activation code PprvK (thereby indicating that the administrator identifier sysID was associated with the terminal serial number of the pin-pad terminal 200 in the database of the terminal management server 350 before the pin-pad terminal 200 received the administrator identifier sysID from the smartcard 210), the merchant has thereby authenticated to the network gateway 400 via at least two authentication factors (administrator identifier sysID, and possession of pin-pad terminal 200 (and smartcard 210) associated with administrator identifier sysID), and the network gateway 400 generates an activation credential response message that includes the terminal ID and the activation code PprvK. At step S1414, the network gateway 400 transmits the activation credential response to the pin-pad terminal 200, over the encrypted channel, in response to the activation credential request.

Steps S1416 to S1422 are substantially similar to steps S802 to S808 (activation method of FIG. 8). Accordingly, after the pin-pad terminal 200 receives the activation credential response, the terminal authentication processor 218 of the pin-pad terminal 200 saves the terminal ID and the activation code PprvK in the volatile memory 214, and generates a pin-pad public cryptographic key PpubK from the activation code PprvK, such that the pin-pad public cryptographic key PpubK and the activation code PprvK are an asymmetric cryptographic key pair. The terminal authentication processor 218 also generates a terminal activation request message that includes the terminal serial number (retrieved from the non-volatile memory 214 of the pin-pad terminal 200), and a certificate signing request (CSR).

The terminal authentication processor 218 may generate the certificate signing request (CSR) from the terminal ID and the activation code, and from the pin-pad public cryptographic key PpubK that the terminal authentication processor 218 generated from the activation code PprvK. In one example, the CSR includes the terminal ID and the pin-pad public cryptographic key PpubK, and the terminal authentication processor 218 digitally-signs the CSR with the activation code PprvK. The terminal activation request may also include an encrypted message authentication code (e.g. HMAC) that the terminal authentication processor 218 generates from the terminal serial number and the CSR.

At step S1416, the pin-pad terminal 200 transmits the terminal activation request to the certificate server 300. The certificate server 300 determines the validity of the terminal activation request. To do so, the certificate generator 314 may use the pin-pad public cryptographic key PpubK that was included with the CSR to verify that the CSR was signed with a private cryptographic key (activation code PprvK) that is associated with the pin-pad public cryptographic key PpubK (i.e. the pin-pad public cryptographic key PpubK and the private cryptographic key that was used to sign the CSR are an asymmetric cryptographic key pair).

If the certificate generator 314 confirms that the CSR was signed with a private cryptographic key associated with the pin-pad public cryptographic key PpubK, at step S1418 the certificate generator 314 may transmit the terminal activation request to the terminal management server 350, requesting that the terminal management server 350 validate the terminal credentials (terminal ID, terminal serial number) included in the terminal activation request. In response, the terminal management server 350 may query its database with the terminal credentials to verify that the terminal credentials are uniquely associated with an activation code PprvK in the database (i.e. the terminal credentials are associated with a legitimate pin-pad terminal 200, and the activation code PprvK and the terminal ID were uniquely associated with the pin-pad terminal 200 before the network gateway 400 provided the pin-pad terminal 200 with the terminal ID). The terminal management server 350 may also verify that the CSR was signed with the activation code PprvK that is uniquely associated with the terminal credentials in its database, for example by signing the CSR with the activation code PprvK ("test-CSR") from the database, and comparing the test-CSR against the signed-CSR that was included in the terminal activation request. The terminal management server 350 may then respond to the certificate server 300 with a validation response, at step S1420.

If the certificate server 300 determines from the digital signature of the CSR or from the validation response received from the terminal management server 350 that the terminal activation request is invalid, the certificate server 300 generates an activation response message that indicates that the terminal activation request is invalid.

Otherwise, if the certificate server 300 determines from the digital signature of the CSR and from the validation response that the terminal activation request is valid, the certificate server 300 has thereby determined that the pin-pad terminal 200 generated the CSR from the activation code PprvK and the terminal ID that the terminal management server 350 associated with the pin-pad terminal 200 (and the terminal management server 350 uniquely associated the activation code PprvK and the terminal ID with the pin-pad terminal 200 before the network gateway 400 provided the pin-pad terminal 200 with the terminal ID), and the certificate generator 314 generates an activation response message that includes the terminal ID and a terminal authentication certificate that the pin-pad terminal 200 can use to authenticate to the network gateway 400. The certificate generator 314 generates the terminal authentication certificate from the terminal ID and the pin-pad public cryptographic key PpubK of the CSR. The terminal authentication certificate may be a X.509 digital certificate that includes the terminal ID, the pin-pad public cryptographic key PpubK, an expiry date and optionally a (renewal) network address (e.g. IP address and/or port number), and the certificate generator 314 digitally-signs the terminal authentication certificate with the private cryptographic key assigned to the certificate server 300.

The certificate server 300 transmits the activation response message to the pin-pad terminal 200, in response to the activation request message, at step S1422.

Steps S1424 to S1430 are substantially similar to steps S1006 to S1012 (gateway setup method of FIG. 10) and steps S1106, S1110, S1112 (terminal validation method of FIG. 11). Accordingly, after the pin-pad terminal 200 receives the activation response message (and authenticates the signature of the terminal authentication certificate), the terminal authentication processor 218 saves the terminal authentication certificate in the volatile memory 214, and may generate a card validation request message that includes the administrator identifier sysID, the hash of the administrator passcode, the local terminal credential and optionally the token cryptogram (received at the pin-pad terminal 200 at step S1406).

The terminal authentication processor 218 may use the terminal authentication certificate to establish an encrypted communications channel with the network gateway 400, and transmits the card validation request to the network gateway 400 over the encrypted channel, at step S1424. Alternately, as discussed above, the pin-pad terminal 200 may have included the administrator identifier sysID, the hash of the administrator passcode, the local terminal credential and the token cryptogram in the activation credentials request transmitted to the network gateway 400 at step S1406.

The network gateway 400 generates a gateway authentication request message that includes the administrator identifier sysID, the hash of the administrator passcode, the local terminal credential and optionally the token cryptogram, and transmits the gateway authentication request to the network device (lottery server) 500 at step S1426. In response, the lottery server 500 may query the token database with the administrator identifier sysID to locate the token public cryptographic key TpubK that is associated with the token private cryptographic key TprvK of the smartcard 210, and may validate the token cryptogram using the located token public cryptographic key TpubK (and thereby confirm that the token cryptogram was generated by the smartcard 210 from the administrator identifier sysID and from the token private cryptographic key TprvK).

The lottery server 500 also validates the credentials included in the gateway authentication request by determining whether the hash of the administrator passcode is associated with the administrator identifier sysID in the token database. If the lottery server 500 determines that the credentials included in the gateway authentication request are not associated with each other in the token database, or the administrator identifier sysID has been "blacklisted" (i.e. the associated smartcard 210 has been reported lost or stolen, or the administrator of the lottery server 500 has detected prior potentially fraudulent use of the associated smartcard 210), the lottery server 500 generates a gateway authentication response message that indicates that the credentials are invalid.

Otherwise, if the lottery server 500 determines that the credentials included in the gateway authentication request are associated with each other in the token database, and optionally also determines that the token cryptogram is valid, the merchant has thereby authenticated to the lottery server 500 by at least two authentication factors (administrator identifier sysID, administrator passcode associated with administrator identifier sysID, and optionally possession of smartcard 210 associated with administrator identifier sysID). Accordingly, the lottery server 500 associates the local terminal credential with the administrator identifier sysID in the token database, and generates a gateway authentication response message that includes a gateway authentication certificate that the network gateway 400 can use to authenticate to the lottery server 500. The lottery server 500 signs the gateway authentication certificate with the private cryptographic key assigned to the lottery server 500.

The lottery server 500 transmits the gateway authentication response to the network gateway 400, in response to the gateway authentication request, at step S1428. If the gateway authentication response indicates that the credentials (or optionally the token cryptogram) included in the gateway authentication request were invalid, the network gateway 400 may generate a card validation response indicating that the card validation request failed.

Otherwise, since the merchant will have authenticated to the lottery server 500 via at least the administrator identifier sysID and the associated administrator passcode if the credentials included in the card validation request are valid (and will have also authenticated to the network gateway 400 via at least the administrator identifier sysID and possession of the associated pin-pad terminal 200 (by step S1412)), the gateway authenticator 414 saves the gateway authentication certificate, together with the local terminal credential (lane #) and the administrator identifier sysID, if the card validation response indicates that the credentials (and optionally the token cryptogram) included in the card validation request were valid. The gateway authenticator 414 then generates a card validation response indicating that the credentials (and optionally the token cryptogram) included in the card validation request were valid.

The network gateway 400 transmits the card validation response to the pin-pad terminal 200, in response to the card validation request, at step S1430. If the card validation response indicates that the card validation request failed, the pin-pad terminal 200 may purge from the non-volatile memory 214 thereof the terminal serial number, the symmetric cryptographic key symK, the credential payload, and the public digital certificate of the network gateway 400, and purges from the volatile memory 214 the terminal authentication certificate, the terminal ID and the activation code PprvK.

Otherwise, if the card validation response indicates that the credentials (and optionally the token cryptogram) included in the card validation request are valid, the pin-pad terminal 200 saves the terminal authentication certificate in the non-volatile memory 214, together with the terminal ID and the activation code PprvK.

7. Second Simplified Terminal Activation and Gateway Setup Variation

Figure 15:
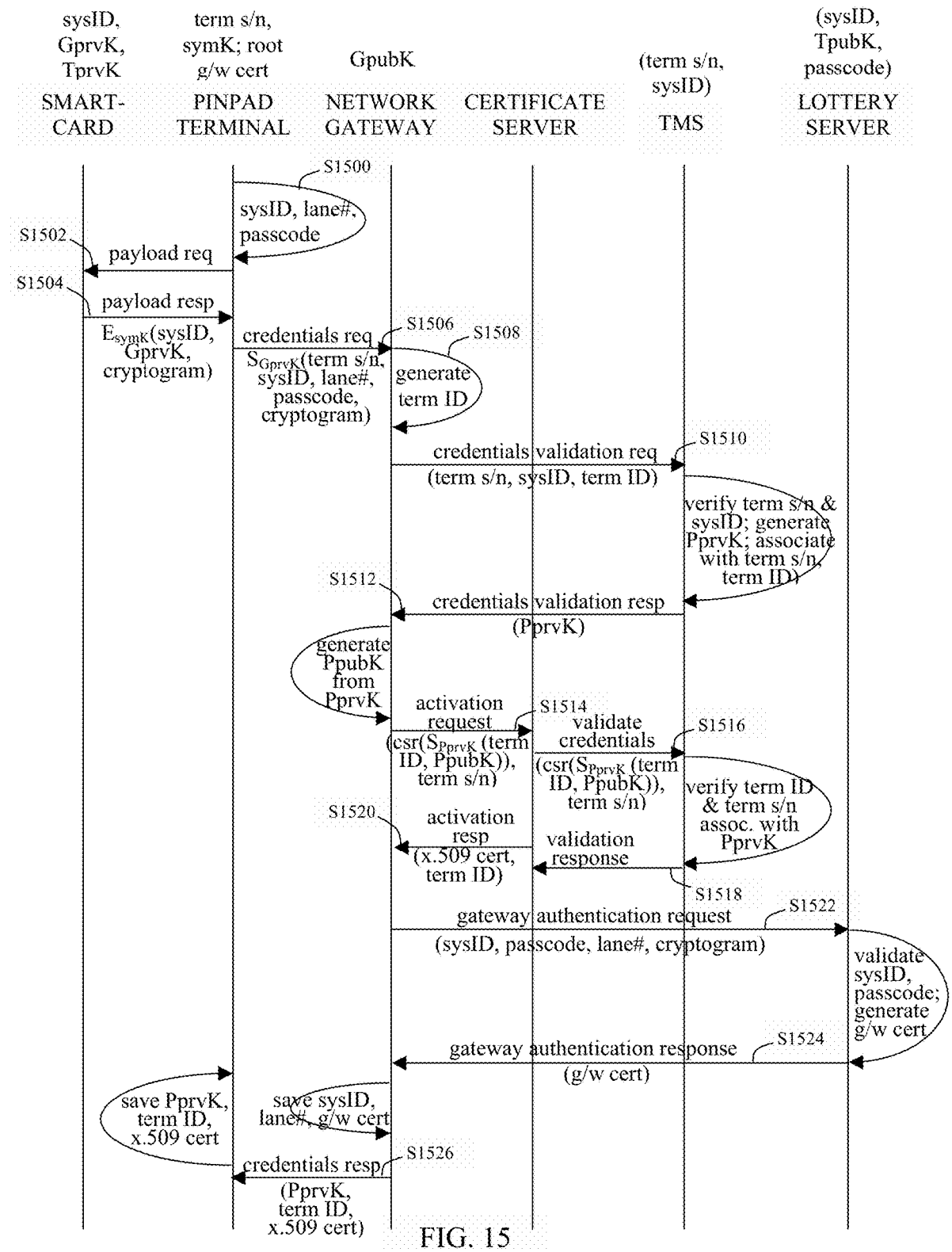
FIG. 15 is a detailed message flow diagram that depicts a second implementation of the simplified terminal activation and gateway setup methods.

In the first implementation of the simplified terminal activation and gateway setup methods discussed above with reference to FIG. 14, the terminal ID and activation code are downloaded to the pin-pad terminal 200, whereupon the pin-pad terminal 200 generates a pin-pad public cryptographic key PpubK corresponding to the activation code PprvK, generates a CSR from the terminal ID and the pin-pad public cryptographic key PpubK, and signs the CSR with the activation code PprvK. A second implementation of the terminal activation and gateway setup methods will now be described, in detail, with reference to FIG. 15. In this implementation, the terminal authentication certificate is downloaded to the pin-pad terminal 200, without the pin-pad terminal 200 generating the CSR or the pin-pad public cryptographic key PpubK.

Steps S1500 to S1512 are substantially similar to steps S1400 to S1412. Accordingly, if the administrator identifier sysID that was input into the pin-pad terminal 200 at step S1500 matches the administrator identifier sysID received from the smartcard 210, the pin-pad terminal 200 generates an activation credentials request that includes the terminal serial number, administrator identifier sysID, local terminal credential (lane number), token cryptogram, and the hash of the administrator passcode.

The pin-pad terminal 200 may sign the activation credentials request with the gateway private cryptographic key GprvK received from the credential payload, and transmits the activation credentials request to the network gateway 400 over the encrypted channel at step S1506.

If the signature of the activation credentials request is valid, the network gateway 400 generates a unique terminal ID at step S1508, and generates an activation credentials validation request message that includes the terminal serial number, administrator identifier sysID, terminal ID, and optionally local terminal credential (e.g. lane number). The network gateway 400 forwards the activation credentials validation request to the terminal management server 350, at step S1510, requesting that the terminal management server 350 validate the credentials (terminal serial number, administrator identifier sysID) included in the activation credentials validation request.

If the terminal management server 350 determines that the credentials included in the activation credential validation request are associated with each other in the database of the terminal management server 350 (thereby indicating that the administrator identifier sysID was associated with the terminal serial number of the pin-pad terminal 200 in the database of the terminal management server 350 before the pin-pad terminal 200 received the administrator identifier sysID from the smartcard 210), the terminal management server 350 generates a unique activation code (pin-pad private cryptographic key) PprvK, associates the activation code PprvK and the terminal ID with the terminal serial number and the administrator identifier sysID in the database (thereby uniquely associating the activation code PprvK with the merchant and the respective pin-pad terminal 200), and generates an activation credentials validation response message that includes the activation code PprvK.

If the activation credentials validation response includes an activation code PprvK, the network gateway 400 generates a pin-pad public cryptographic key PpubK from the activation code PprvK, such that the pin-pad public cryptographic key PpubK and the activation code PprvK are an asymmetric cryptographic key pair. The network gateway 400 also generates a terminal activation request message that includes the terminal serial number, and a certificate signing request (CSR).

The CSR may include the terminal ID and the pin-pad public cryptographic key PpubK, and the network gateway 400 digitally-signs the CSR with the activation code PprvK. The terminal activation request may also include an encrypted message authentication code (e.g. HMAC) that the network gateway 400 generates from the terminal serial number and the CSR.

At step S1514, the network gateway 400 transmits the terminal activation request to the certificate server 300. The certificate generator 314 may use the pin-pad public cryptographic key PpubK to verify that the CSR was signed with the activation code PprvK. At step S1516, the certificate generator 314 may also transmit the terminal activation request to the terminal management server 350, requesting that the terminal management server 350 validate the terminal credentials (terminal ID, terminal serial number) included in the terminal activation request. In response, the terminal management server 350 may verify that the terminal credentials are uniquely associated with an activation code PprvK in its database (i.e. the terminal credentials are associated with a legitimate pin-pad terminal 200, and the activation code PprvK and the terminal ID were associated with the pin-pad terminal 200 before the network gateway 400 generated the terminal activation request), and may also verify that the CSR was signed with the activation code PprvK that is associated with the terminal credentials in its database. The terminal management server 350 may then respond to the certificate server 300 with a validation response, at step S1518.

If the certificate server 300 determines from the digital signature of the CSR and from the validation response received from the terminal management server 350 that the terminal activation request is valid, the certificate server 300 has thereby determined that the CSR was generated from the activation code PprvK and the terminal ID that the terminal management server 350 associated with the pin-pad terminal 200 (and the terminal management server 350 uniquely associated the activation code PprvK and the terminal ID with the pin-pad terminal 200 before the network gateway 400 generated the terminal activation request), and the certificate generator 314 generates an activation response message that includes the terminal ID and a terminal authentication certificate that the pin-pad terminal 200 can use to authenticate to the network gateway 400. The terminal authentication certificate may be a X.509 digital certificate that includes the terminal ID, the pin-pad public cryptographic key PpubK, an expiry date and optionally a (re-newal) network address (e.g. IP address and/or port number), and the certificate generator 314 digitally-signs the terminal authentication certificate with the private cryptographic key assigned to the certificate server 300.

The certificate server 300 transmits the activation response message to the network gateway 400, in response to the activation request message, at step S1520.

Steps S1522 to S1526 are substantially similar to steps S1426 to S1430.

Accordingly, after the network gateway 400 receives the terminal authentication certificate, the network gateway 400 may generate a gateway authentication request message that includes the administrator identifier sysID, the hash of the administrator passcode, the local terminal credential and optionally the token cryptogram, and transmits the gateway authentication request to the network device (lottery server) 500 at step S1522. In response, the lottery server 500 locates the token public cryptographic key TpubK that is associated with the token private cryptographic key TprvK of the smartcard 210, and may validate the token cryptogram using the located token public cryptographic key TpubK.

The lottery server 500 also validates the credentials included in the gateway authentication request by determining whether the hash of the administrator passcode is associated with the administrator identifier sysID in the token database. If the lottery server 500 determines that the credentials included in the gateway authentication request are associated with each other in the token database, and optionally also determines that the token cryptogram is valid, the lottery server 500 associates the local terminal credential with the administrator identifier sysID in the token database, and generates a gateway authentication response message that includes a gateway authentication certificate that the network gateway 400 can use to authenticate to the lottery server 500. The lottery server 500 signs the gateway authentication certificate with the private cryptographic key assigned to the lottery server 500.

The lottery server 500 transmits the gateway authentication response to the network gateway 400, in response to the gateway authentication request, at step S1524. If the gateway authentication response indicates that the credentials (and optionally the token cryptogram) included in the gateway authentication request were valid, the network gateway 400 may generate an activation credentials response message indicating that the gateway authentication request failed.

Otherwise, the gateway authenticator 414 saves the gateway authentication certificate, together with the local terminal credential and the administrator identifier sysID, if the gateway authentication response indicates that the credentials (and optionally the token cryptogram) included in the gateway authentication request were valid. The gateway authenticator 414 then generates an activation credentials response message that includes the terminal ID, terminal authentication certificate and the activation code PprvK, indicating that the credentials (and optionally the token cryptogram) included in the activation credentials request were valid.

The network gateway 400 transmits the activation credentials response message to the pin-pad terminal 200, over the encrypted channel, in response to the activation credentials request, at step S1524.

If the activation credentials response indicates that the gateway authentication request failed, the pin-pad terminal 200 may purge from the non-volatile memory 214 thereof the terminal serial number, the symmetric cryptographic key symK, the credential payload, and the public digital certificate of the network gateway 400.

Otherwise, if the activation credentials response indicates that the credentials (and optionally the token cryptogram) included in the gateway authentication request are valid, the pin-pad terminal 200 saves the terminal authentication certificate in the non-volatile memory 214, together with the terminal ID and the activation code PprvK.

8. Transaction Proposal Processing

Figure 16:
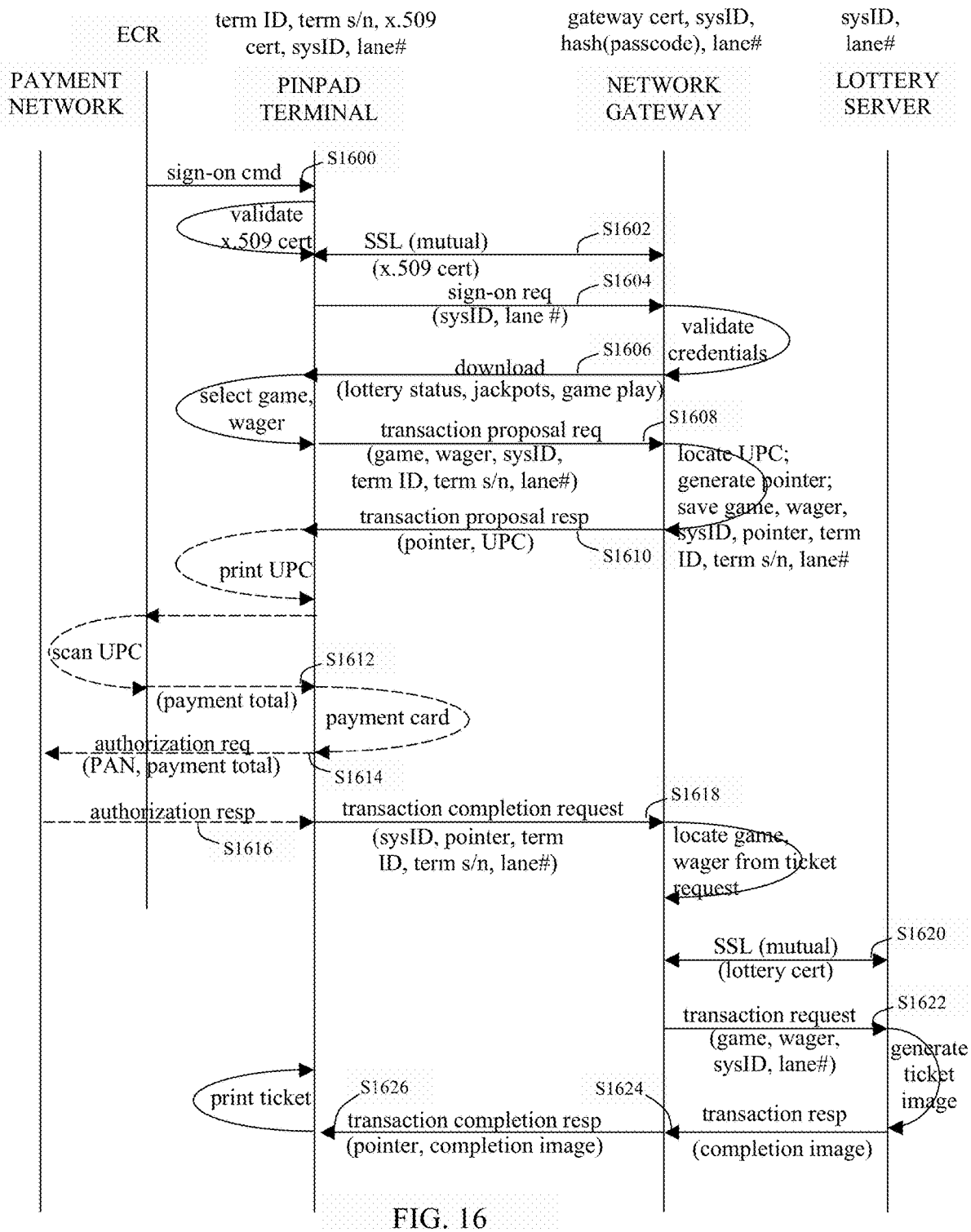
FIG. 16 is a detailed message flow diagram that depicts a sample embodiment of the transaction processing method implemented by the authentication network.

After the merchant has activated the pin-pad terminals 200 and set up the network gateway 400 (and optionally validated the pin-pad terminals 200 to the lottery server), via the terminal activation method of FIG. 8, the gateway setup method of FIG. 10, and the terminal validation method of FIG. 11, or via the simplified terminal activation and gateway setup methods of FIG. 12, 13, 14 or 15, the merchant's customer may execute the transaction processing method, depicted in FIG. 16, to complete an electronic transaction with a network device 500 (e.g. lottery server) of the second computer network 104.

At step S1600, the operator of the ECR 250 transmits a sign-on request message from the ECR 250 to the associated pin-pad terminal 200. After the operator of the ECR 250 signs on to the pin-pad terminal 200, the operator begins inputting into the electronic shopping basket particulars of the merchant's goods/services that the customer is purchasing. As discussed, the operator of the ECR 250 may use the bar code scanner of the ECR 250 to read the bar codes that are affixed to or otherwise associated with the merchant's goods/services being purchased, whereupon the checkout processor of the ECR 250 may extract the UPCs from the bar codes. Alternately, the operator may use the input device of the ECR 250 to manually enter the UPCs, for example where the UPC is not readable by the bar code scanner. The checkout processor then queries the local product code database with the UPC for the particulars (e.g. current price, good/service name) associated with the UPC, and saves the associated particulars in the electronic shopping basket.

While the operator of the ECR 250 is inputting the particulars of the merchant's goods/services into the electronic shopping basket, the terminal authentication processor 218 of the pin-pad terminal 200 determines from the expiry date of the terminal authentication certificate whether the terminal authentication certificate is still valid and does not need to be renewed. If the terminal authentication processor 218 determines that the terminal authentication certificate is still valid and does not need to be renewed, the terminal authentication processor 218 uses the terminal authentication certificate to authenticate to and to establish a mutually-authenticated SSL connection with the network gateway 400. As part of this authentication step, the network gateway 400 may validate the terminal authentication certificate by confirming that the terminal authentication certificate was signed with the private cryptographic key of the certificate server 300, and may also confirm that the terminal ID identified on the terminal authentication certificate is associated with a pin-pad terminal 200 in the database of the terminal management server 350.

The transaction processor 220 then generates a sign-on authentication request message that includes one or more credentials which the transaction processor 220 reads from the volatile memory 214 of the pin-pad terminal 200. The sign-on authentication request message may include the administrator credential sysID and the local terminal credential of the pin-pad terminal 200 (if assigned). The transaction processor 220 transmits the sign-on authentication request message to the network gateway 400 over the encrypted channel, at step S1604.

The gateway authenticator 414 validates the sign-on authentication request by verifying that the network gateway 400 has associated the specified local terminal credential with the specified administrator sysID. The gateway authenticator 414 then generates a sign-on authentication response message, indicative of the validity of the credentials. The gateway authenticator 414 transmits the sign-on authentication response message to the pin-pad terminal 200, in response to the sign-on authentication request, at step S1606. If the credentials included with the sign-on authentication request are not valid, the sign-on authentication response message indicates that the sign-on authentication request failed.

The network gateway 400 may periodically receive summary transaction (lottery) information from the network device (lottery server) 500 (in response to "ping" messages transmitted by the network gateway 400, for example). The summary transaction (lottery) information typically includes a list of the various transactions (lottery games) that are available and, for each available transaction (lottery game), the deadline for the transaction (e.g. for purchasing lottery tickets and the current jackpot). If the credentials included with the sign-on authentication request are valid, in on example the sign-on authentication response message indicates that the sign-on authentication request was successful, and the gateway authenticator 414 downloads the most recent summary lottery information to the pin-pad terminal 200. Alternately, if the lottery information does not change, the pin-pad terminal 200 may be preconfigured with the lottery information.

If the sign-on authentication response is successful, the transaction processor 220 may prompt the customer to select one of the available transactions (lottery games) and the corresponding price (wager amount). The customer may use the data input device 202 to select the desired transaction (lottery game) from the list of available transactions (lottery games), and to input the desired price (wager amount).

The customer proposes a transaction with the network device (lottery server) 500 by entering the requested information into the pin-pad terminal 200. From one or more administrator credentials and/or one or more terminal credentials, the transaction processor 220 generates a transaction proposal message that specifies the particulars of the proposed transaction. The transaction proposal message may identify the selected transaction (lottery game) and price (wager amount), and may also include one or more administrator credentials and/or one or more terminal credentials which the transaction processor 220 reads from the memory 214 of the pin-pad terminal 200. The transaction proposal message may include the administrator sysID, terminal ID, terminal serial number, and lane number. The transaction processor 220 transmits the transaction proposal request to the network gateway 400 over the encrypted connection, at step S1608.

In a previous electronic transaction, the operator of the network device 500 may have detected suspicious or fraudulent activity involving the pin-pad terminal 200, and may have reported said activity to the operator of the terminal management server 350. In response, the operator of the terminal management server 350 may have updated the database of the terminal management server 350 to indicate that the terminal authentication certificate assigned to the pin-pad terminal 200 is revoked. Accordingly, while not shown in FIG. 16, after receiving the transaction proposal request the gateway authenticator 414 may transmit to the terminal management server 350 a certificate status request message that includes the terminal ID and/or terminal serial number and requests that the terminal management server 350 determine whether the terminal authentication certificate that is associated with the specified terminal credentials has been revoked. The terminal management server 350 may respond to the network gateway 400 with a certificate status response message indicating the revocation status of the terminal authentication certificate.

If the terminal authentication certificate has been revoked, the transaction proposal message is not processed further. Otherwise, the gateway authenticator 414 generates a random transaction pointer, and associates the transaction pointer with the transaction proposal message. The gateway authenticator 414 may generate the transaction pointer from one or more of the selected transaction (lottery game), price (wager amount), administrator sysID, terminal ID, terminal serial number, and lane number and a unique serial number, so that the transaction pointer is uniquely associated with the proposed transaction. In one example, however, the elements of the transaction proposal message cannot be determined from the transaction pointer.

The gateway authenticator 414 then generates a transaction proposal response message that includes the transaction pointer and provides an indication of the payment particulars (e.g. price, wager amount) for the proposed transaction. The indication of payment particulars may comprise a payment image that is associated with the payment particulars. In one example, the payment image comprises a bar code (e.g.

universal product code or UPC) which the gateway authenticator 414 generates from the selected transaction (lottery game) and price (wager amount), and the price (wager amount) is explicitly identified (encoded) in the bar code. Alternately, instead of the price (wager amount) being encoded in the bar code, a product code that identifies the transaction type (e.g. the type of lottery ticket purchased (e.g. basic board, basic board+bonus numbers) and the selected lottery game) but does not explicitly identify the price (i.e. implicitly identifies the wager amount based on the type of lottery ticket purchased) may be encoded in the bar code. The gateway authenticator 414 transmits the transaction proposal response message to the pin-pad terminal 200, in response to the transaction proposal, at step S1610.

Upon receipt of the transaction proposal response, the transaction processor 220 saves the transaction pointer in the memory 214, and may render the payment image particulars on the display device 204 of the pin-pad terminal 200. The checkout processor of the ECR 250 may then input the price (wager amount) into the electronic shopping basket of the ECR 250.

If the payment particulars comprise a payment image (e.g. universal product code), the transaction processor 220 may use the printer of the display device 204 to render the payment image, and the operator of the ECR 250 may then use the bar code scanner of the ECR 250 to scan the printed payment image and thereby input the wager amount into the electronic shopping basket. Alternately, the transaction processor 220 may use the LCD panel of the display device 204 to render the payment image, and the operator of the ECR 250 may use the bar code scanner to read the payment image.

If the price (wager amount) is explicitly encoded in the payment image, the checkout processor of the ECR 250 extracts the price (wager amount) from the bar code and saves the price (wager amount) in the electronic shopping basket. Alternately, if the payment image only encodes a product code for the proposed transaction, not the price (wager amount) (i.e. the price (wager amount) is indirectly encoded in the bar code), the checkout processor may extract the product code from the payment image, query the local product code database with the product code for the price associated with the product code, and save the price (wager amount) in the electronic shopping basket.

After the operator of the ECR 250 has finished inputting into the electronic shopping basket the price (wager amount) for the proposed transaction with the network device 500 and the particulars of all the merchant's goods/services that are being purchased by the customer, the operator uses the input device of the ECR to issue to the checkout processor of the ECR 250 a command to close the electronic shopping basket. The checkout processor then calculates the total amount owed for the proposed transaction with the network device 500 and the merchant's goods/services (if any) listed in the electronic shopping basket. The checkout processor may then transmit to the pin-pad terminal 200 an indication of the total payment amount owed, at step S1612.

The customer then provides payment for the proposed transaction and the merchant's goods/services (if any). The customer may provide cash payment for the proposed transaction and the merchant's goods/services (if any), and the operator of the ECR 250 may use the ECR 250 to provide the transaction processor 220 with a successful payment confirmation message. However, since the customer has used the pin-pad terminal 200 to generate the transaction proposal, the transaction processor 220 may invoke the payment processor 216, upon receipt of the payment particulars from the ECR 250, to thereby allow the customer to provide electronic payment for the proposed transaction and the merchant's goods/services (if any) via the acquirer network 106.

To provide electronic payment of the total payment amount, the customer may interface the customer's payment card with the contact/contactless token interface 209 of the pin-pad terminal 200 to thereby provide the payment processor 216 with the required payment account information (e.g. credit card number, debit account number). The customer may also use the data input device 202 to provide any required customer credentials (e.g. personal identification number). The payment processor 216 may transmit over the acquirer network 106, at step S1614, an authorization request that includes the indication of the total payment amount and the payment account information. The payment processor 216 uses the cryptographic payment keys to encrypt the authorization request. After receiving an authorization response from the acquirer network 106 at step S1616, and decrypting the authorization response with the cryptographic payment keys, the payment processor 216 may provide the transaction processor 220 with a successful payment confirmation message confirming that the customer successfully provided payment in the total payment amount.

Upon receiving a successful payment confirmation message, the transaction processor 220, generates a transaction completion request message that requests completion of the proposed transaction with the network device 500, and includes the transaction pointer. The transaction completion request message may also include one or more administrator credentials and/or one or more terminal credentials which the transaction processor 220 reads from the memory 214 of the pin-pad terminal 200. In one example, the transaction completion request message includes the administrator sysID, terminal ID, terminal serial number, and lane number. If the transaction processor 220 does not receive a successful payment confirmation message from the ECR 250 or the payment processor 216 within a predetermined time period, the transaction processor 220 does not generate a transaction completion request message and instead may delete the transaction pointer from the memory 214 to thereby prevent the customer from completing the proposed transaction with the network device 500.

The transaction processor 220 transmits the transaction completion request to the network gateway 400 over the encrypted channel, at step S1618. Since the transaction processor 220 transmits the transaction completion request after receiving the successful payment confirmation message, in effect the transaction completion request is only transmitted after the pin-pad terminal 200 receives confirmation from the ECR 250 of payment for all items that were entered in the electronic shopping basket.

In response to the transaction completion request, the gateway authenticator 414 uses the administrator sysID (included in the transaction completion request) to locate the corresponding gateway authentication certificate, and then uses the located gateway authentication certificate to establish an encrypted communications channel with the network device 500 via the second computer network 104, at step S1620. Typically, the gateway authenticator 414 uses the gateway authentication certificate to establish a mutually-authenticated SSL connection with the network device 500.

The gateway authenticator 414 also uses the transaction completion request to locate the previously-selected transaction (lottery game) and price (wager amount), and generates a transaction request message that specifies the selected transaction (lottery game) and price (wager amount). Since the transaction completion request includes the transaction pointer and one or more terminal credentials that are uniquely associated with the pin-pad terminal 200, in effect the pin-pad terminal 200 has authenticated to the network gateway 400 when the gateway authenticator 414 locates the previously-selected transaction (lottery game). The transaction request message may also include one or more administrator credentials and/or one or more terminal credentials from the transaction completion request. In one example, the transaction request message includes the administrator sysID and lane number. At step S1622, the gateway authenticator 414 transmits the transaction request message to the network device 500 over the encrypted channel that is established between the network gateway 400 and the network device 500.

The network device 500 may validate the transaction request message by verifying that the network device 500 has already associated the administrator sysID and lane number with the gateway authentication certificate (e.g. after step S1110 of the terminal registration method). If the network device 500 is able to validate the transaction request message, the pin-pad terminal 200 has thereby authenticated to the network device 500 (using an administrator credential (sysID) and a terminal credential (lane number)), and the network device 500 may generate a transaction response message that includes a transaction completion image that provides confirmation of completion of the proposed transaction. In one example, the network device 500 randomly generates any/all game numbers/indicia that are required for the selected lottery game, and the transaction completion image comprises a lottery ticket image that depicts the generated game numbers/indicia. Otherwise, the network device 500 generates a transaction response message that indicates that the transaction request could not be validated.

The network device 500 downloads the transaction response message to the network gateway 400, in response to the transaction request message, at step S1624. The gateway authenticator 414 generates a transaction completion response message from the transaction response message. If the transaction request was successfully validated, the transaction completion response message may include the transaction pointer and the transaction completion image (lottery ticket image). The gateway authenticator 414 downloads the transaction completion response message to the pin-pad terminal 200, in response to the transaction completion request, at step S1626.

If the transaction completion request was successfully validated, the transaction processor 220 deletes the transaction proposal response (transaction pointer and the associated UPC) from the memory 214, and prints the transaction completion image (lottery ticket image) that was included with the transaction completion response.

The invention claimed is:

1. A network gateway, comprising:
   a first network interface configured to interface the network gateway with a first computer network;
   a second network interface configured to interface the network gateway with a second computer network distinct from the first computer network; and
   a gateway authenticator in communication with the network interfaces and configured to:
   (i) receive from a pin-pad terminal, via the first computer network, an activation credential request including a first administrator credential, the pin-pad terminal being configured to receive the first administrator credential from a hardware token interfaced with the pin-pad terminal;
   (ii) verify that, before the pin-pad terminal received the first administrator credential from the hardware token, the first computer network associated the first administrator credential with the pin-pad terminal; and
   (iii) after the verification, install a digital authentication certificate in the pin-pad terminal, the digital authentication certificate facilitating authentication of the pin-pad terminal to the second computer network via the network gateway.

2. The network gateway according to claim 1, wherein the activation credential request includes a first terminal credential uniquely associated with the pin-pad terminal, and wherein the gateway authenticator is configured to install the digital authentication certificate after verifying that, before the pin-pad terminal received the first administrator credential from the hardware token, the first computer network associated the first administrator credential with the first terminal credential.

3. The network gateway according to claim 1, wherein the network gateway is configured to receive a second administrator credential from an input device of the pin-pad terminal, and to install the digital authentication certificate after confirming that the second computer network validated the administrator credentials.

4. The network gateway according to claim 1, wherein the activation credential request includes a first terminal credential uniquely associated with the pin-pad terminal, and wherein the gateway authenticator is configured to:
   provide the pin-pad terminal with a private cryptographic key, in response to the activation credential request, after verifying that, before the pin-pad terminal received the first administrator credential from the hardware token, the first computer network associated the first administrator credential with the pin-pad terminal; and
   receive the digital authentication certificate from the first computer network after the first computer network verifies that the pin-pad terminal provided the first computer network with a terminal activation request and generated the terminal activation request from the private cryptographic key.

5. The network gateway according to claim 4, wherein the gateway authenticator is configured to provide the private cryptographic key after verifying that, before the pin-pad terminal received the first administrator credential from the hardware token, the first computer network associated the first administrator credential with the first terminal credential.

6. The network gateway according to claim 4, wherein the gateway authenticator is configured to provide the pin-pad terminal with the private cryptographic key and a second terminal credential, and to install the digital authentication certificate after the first computer network verifying that (i) the pin-pad terminal generated the terminal activation request from the private cryptographic key and the second terminal credential and (ii) before the network gateway provided the pin-pad terminal with the second terminal credential, the private cryptographic key and the second terminal credential were uniquely associated with the pin-pad terminal.

7. The network gateway according to claim 1, wherein the activation credential request includes a first terminal credential uniquely associated with the pin-pad terminal, and wherein the gateway authenticator is configured to:

receive a private cryptographic key from the first computer network after verifying that, before the pin-pad terminal received the first administrator credential from the hardware token, the first computer network associated the first administrator credential with the pin-pad terminal;
generate a terminal activation request from the private cryptographic key, and transmit the terminal activation request to the first computer network; and
receive the digital authentication certificate from the first computer network in response to the terminal activation request, after the first computer network verifies that the terminal activation request was generated from the private cryptographic key.

8. The network gateway according to claim 7, wherein the gateway authenticator is configured to the receive the digital authentication certificate from the first computer network after the first computer network verifying that, before the pin-pad terminal received the first administrator credential from the hardware token, the first computer network associated the first administrator credential with the first terminal credential.

9. The network gateway according to claim 7, wherein the gateway authenticator is configured to generate a second terminal credential, generate the terminal activation request from the private cryptographic key and the second terminal credential, and receive the digital authentication certificate from the first computer network after the first computer network verifies that (i) the terminal activation request was generated from the private cryptographic key and the second terminal credential and (ii) before the network gateway generated the terminal activation request, the private cryptographic key and the second terminal credential were associated with the pin-pad terminal.

10. A method of remotely activating a pin-pad terminal, the method comprising:
the pin-pad terminal receiving a first administrator credential from a hardware token interfaced with the pin-pad terminal;
a network gateway receiving from the pin-pad terminal, via a first computer network, an activation credential request including the first administrator credential;
the network gateway verifying that, before the pin-pad terminal received the first administrator credential from the hardware token, the first computer network associated the first administrator credential with the pin-pad terminal; and
after the verifying, the network gateway installing a digital authentication certificate in the pin-pad terminal, the digital authentication certificate facilitating authentication of the pin-pad terminal to a second computer network, via the network gateway, distinct from the first computer network.

11. The method according to claim 10, wherein the activation credential request includes a first terminal credential uniquely associated with the pin-pad terminal, the first terminal credential being stored in a memory of the pin-pad terminal prior to the network gateway receiving the activation credential request.

12. The method according to claim 11, wherein the installing a digital authentication certificate comprises the first computer network providing the pin-pad terminal with the digital authentication certificate after verifying that, before the pin-pad terminal received the first administrator credential from the hardware token, the first computer network associated the first administrator credential with the first terminal credential.

13. The method according to claim 10, wherein the installing a digital authentication certificate comprises the network gateway receiving a second administrator credential from the pin-pad terminal, and the pin-pad terminal installing the digital authentication certificate in a memory thereof after the network gateway confirming that the second computer network validated the administrator credentials.

14. The method according to claim 11, wherein the installing a digital authentication certificate comprises:
the network gateway providing the pin-pad terminal with a private cryptographic key in response to the activation credential request, the network gateway providing the private cryptographic key after verifying that, before the pin-pad terminal received the first administrator credential from the hardware token, the first computer network associated the first administrator credential with the pin-pad terminal;
the first computer network receiving a terminal activation request from the pin-pad terminal; and
the first computer network providing the pin-pad terminal with the digital authentication certificate in response to the terminal activation request, the first computer network providing the digital authentication certificate after verifying that the pin-pad terminal generated the terminal activation request from the private cryptographic key.

15. The method according to claim 14, wherein the providing a private cryptographic key comprises the network gateway providing the pin-pad terminal with the private cryptographic key after the network gateway verifying that, before the pin-pad terminal received the first administrator credential from the hardware token, the first computer network associated the first administrator credential with the first terminal credential.

16. The method according to claim 14, wherein the providing a private cryptographic key comprises the network gateway providing the pin-pad terminal with the private cryptographic key and a second terminal credential, and the installing a digital authentication certificate comprises the first computer network providing the pin-pad terminal with the digital authentication certificate after verifying that (i) the pin-pad terminal generated the terminal activation request from the private cryptographic key and the second terminal credential and (ii) before the network gateway provided the pin-pad terminal with the second terminal credential, the private cryptographic key and the second terminal credential were uniquely associated with the pin-pad terminal.

17. The method according to claim 11, wherein the providing a digital authentication certificate comprises:
the network gateway receiving a private cryptographic key from the first computer network after the network gateway verifying that, before the pin-pad terminal received the first administrator credential from the hardware token, the first computer network associated the first administrator credential with the pin-pad terminal;
the network gateway generating a terminal activation request from the private cryptographic key, and transmitting the terminal activation request to the first computer network; and
the network gateway receiving the digital authentication certificate from the first computer network in response to the terminal activation request, the network gateway receiving the digital authentication certificate after the first computer network verifying that the terminal activation request was generated from the private cryptographic key.

18. The method according to claim 17, wherein the receiving the digital authentication certificate comprises the network gateway receiving the digital authentication certificate from the first computer network after the first computer network verifying that, before the pin-pad terminal received the first administrator credential from the hardware token, the first computer network associated the first administrator credential with the first terminal credential.

19. The method according to claim 17, wherein the generating a terminal activation request comprises the network gateway generating a second terminal credential, and generating the terminal activation request from the private cryptographic key and the second terminal credential, and the receiving the digital authentication certificate comprises the network gateway receiving the digital authentication certificate from the first computer network after the first computer network verifying that (i) the terminal activation request was generated from the private cryptographic key and the second terminal credential and (ii) before the network gateway generated the terminal activation request, the private cryptographic key and the second terminal credential were associated with the pin-pad terminal.

20. A non-transitory computer-readable medium comprising computer processing instructions stored thereon for execution by a network gateway, the computer processing instructions, when executed by the network gateway causing the network gateway to:

receive from a pin-pad terminal, via a first computer network, an activation credential request including a first administrator credential, the pin-pad terminal being configured to receive the first administrator credential from a hardware token interfaced with the pin-pad terminal;

verify that, before the pin-pad terminal received the first administrator credential from the hardware token, the first computer network associated the first administrator credential with the pin-pad terminal; and after the verification, install a digital authentication certificate in the pin-pad terminal, the digital authentication certificate facilitating authentication of the pin-pad terminal to a second computer network, via the network gateway, distinct from the first computer network.

\* \* \* \* \*